(12) United States Patent
Campbell et al.

(10) Patent No.: US 11,587,246 B2
(45) Date of Patent: Feb. 21, 2023

(54) METROLOGY SYSTEM WITH PROJECTED PATTERN FOR POINTS-FROM-FOCUS TYPE PROCESSES

(71) Applicant: Mitutoyo Corporation, Kanagawa-ken (JP)

(72) Inventors: Shannon Roy Campbell, Woodinville, WA (US); Lukasz Redlarski, Eindhoven (NE)

(73) Assignee: Mitutoyo Corporation, Kanagawa-ken (JP)

( * ) Notice: Subject to any disclaimer, the term of this patent is extended or adjusted under 35 U.S.C. 154(b) by 239 days.

(21) Appl. No.: 17/085,700

(22) Filed: Oct. 30, 2020

(65) Prior Publication Data
US 2022/0138976 A1    May 5, 2022

(51) Int. Cl.
*G06T 7/571*    (2017.01)
*H04N 5/225*    (2006.01)
(Continued)

(52) U.S. Cl.
CPC .......... *G06T 7/571* (2017.01); *G01B 11/2513* (2013.01); *G02B 21/025* (2013.01); *G06T 7/521* (2017.01); *H04N 5/2256* (2013.01); *H04N 5/232123* (2018.08); *H04N 5/232125* (2018.08); *H04N 5/232133* (2018.08); *G06T 2207/10028* (2013.01); *G06T 2207/10148* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 4,512,642 A | * | 4/1985 | Ito .......................... G03F 9/7026 |
| | | | 250/201.3 |
| 6,229,913 B1 | | 5/2001 | Nayar et al. |

(Continued)

OTHER PUBLICATIONS

Chakrova et al., "Studying different illumination patterns for resolution improvement in fluorescence microscopy," *Optics Express* (23)24, pp. 31367-31383, 2015. (17 pages).

(Continued)

*Primary Examiner* — Clifford Hilaire
(74) *Attorney, Agent, or Firm* — Seed IP Law Group LLP

(57) ABSTRACT

A metrology system is provided including a projected pattern for points-from-focus type processes. The metrology system includes an objective lens portion, a light source, a pattern projection portion and a camera. Different lenses (e.g., objective lenses) having different magnifications and cutoff frequencies may be utilized in the system. The pattern projection portion includes a pattern component with a pattern. At least a majority of the area of the pattern includes pattern portions that are not recurring at regular intervals across the pattern (e.g., as corresponding to a diverse spectrum of spatial frequencies that result in a relatively flat power spectrum over a desired range and with which different lenses with different cutoff frequencies may be utilized). The pattern is projected on a workpiece surface (e.g., for producing contrast) and an image stack is acquired, from which focus curve data is determined that indicates 3 dimensional positions of workpiece surface points.

24 Claims, 10 Drawing Sheets

(51) Int. Cl.
*G06T 7/521* (2017.01)
*H04N 5/232* (2006.01)
*G01B 11/25* (2006.01)
*G02B 21/02* (2006.01)

(56) References Cited

U.S. PATENT DOCUMENTS

| | | | |
|---|---|---|---|
| 6,542,180 B1* | 4/2003 | Wasserman | H04N 5/2354 |
| | | | 348/E5.038 |
| 7,030,351 B2 | 4/2006 | Wasserman et al. | |
| 7,324,682 B2 | 1/2008 | Wasserman | |
| 7,454,053 B2 | 11/2008 | Bryll et al. | |
| 7,570,795 B2 | 8/2009 | Yu et al. | |
| 7,608,813 B1 | 10/2009 | Milvich et al. | |
| 7,627,162 B2 | 12/2009 | Blanford et al. | |
| 8,111,905 B2 | 2/2012 | Campbell | |
| 8,111,938 B2 | 2/2012 | Bryll et al. | |
| 8,309,906 B2 | 11/2012 | Kapner et al. | |
| 8,581,162 B2 | 11/2013 | Campbell | |
| 8,928,874 B2 | 1/2015 | Patzwald | |
| 8,995,749 B2 | 3/2015 | Bryll | |
| 9,060,117 B2 | 6/2015 | Bryll et al. | |
| 9,143,674 B2 | 9/2015 | Gladnick | |
| 9,602,715 B2 | 3/2017 | Gladnick | |
| 9,612,136 B1 | 4/2017 | Cook | |
| 9,830,694 B2 | 11/2017 | Bryll | |
| 9,881,400 B2 | 1/2018 | Zuiderweg et al. | |
| 9,958,294 B2 | 5/2018 | Cook | |
| 10,520,301 B1 | 12/2019 | Tobiason | |
| 2005/0213807 A1* | 9/2005 | Wasserman | G06T 7/0004 |
| | | | 382/152 |
| 2006/0093205 A1* | 5/2006 | Bryll | G06V 10/26 |
| | | | 382/152 |
| 2010/0158343 A1* | 6/2010 | Bryll | G02B 7/36 |
| | | | 382/141 |
| 2011/0103679 A1* | 5/2011 | Campbell | G02B 7/36 |
| | | | 382/152 |
| 2014/0063281 A1* | 3/2014 | Hoffman | G02B 21/06 |
| | | | 348/222.1 |
| 2014/0368726 A1* | 12/2014 | Gladnick | G01B 11/24 |
| | | | 348/349 |
| 2017/0013185 A1* | 1/2017 | Gladnick | G02F 1/33 |
| 2018/0270465 A1* | 9/2018 | Bendall | G01N 21/954 |

OTHER PUBLICATIONS

Hoffman et al., "Sectioning and super-resolution using unknown random patterns," *Proc. of SPIE* 9713, Image Acquisition and Processing XXIII, pp. 971306(1-8), 2016. (8 pages).

Hoffman et al., "Structured illumination microscopy using random intensity incoherent reflectance," *Journal of Biomedical Optics* 18(6), pp. 061216(1-7), 2013. (8 pages).

Kanthamma et al. "Shape from Focus," *International Journal of Engineering Research and Applications* 2(4), pp. 686-692, 2012, (7 pages).

Mitutoyo Corporation & Micro Encoder Inc., "QVPAK® 3D CNC Vision Measuring Machine," User's Guide, Version 7, Series No. 359, 2003, 329 pages.

Newton et al., "Areal topography measurement of metal additive surfaces using focus variation microscopy," *Additive Manufacturing* 25(2019), pp. 365-389, Nov. 2018, (25 pages).

Noguchi et al., "Microscopic Shape from Focus Using Active Illumination," Department of Computer Science, Columbia University, New York, NY, 6 pages.

* cited by examiner

METROLOGY SYSTEM WITH PROJECTED PATTERN FOR POINTS-FROM-FOCUS TYPE PROCESSES

BACKGROUND

Technical Field

This disclosure relates to precision metrology using non-contact workpiece surface measurement (e.g., in a machine vision inspection system) and, more particularly, to processes for determining Z-heights of points on a workpiece surface.

Description of the Related Art

Precision non-contact metrology systems such as precision machine vision inspection systems (or "vision systems" for short) may be utilized to obtain precise dimensional measurements of objects and to inspect various other object characteristics, and may include a computer, a camera and optical system, and a precision stage that moves to allow workpiece traversal and inspection. One exemplary prior art system is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, which is hereby incorporated by reference in its entirety. This type of system uses a microscope-type optical system and moves the stage to provide inspection images of either small or relatively large workpieces.

General-purpose precision machine vision inspection systems are generally programmable to provide automated video inspection. Such systems typically include GUI features and predefined image analysis "video tools" such that operation and programming can be performed by "non-expert" operators. For example, U.S. Pat. No. 6,542,180, which is incorporated herein by reference in its entirety, teaches a vision system that uses automated video inspection including the use of various video tools.

Accuracies in the micron or sub-micron range are often desired in such systems. This is particularly challenging with regard to Z-height measurements. Z-height measurements (along the optical axis of the camera system) are generally derived from a "best focus" position, such as that determined by an autofocus tool. Determining a best focus position is a relatively complex process that generally depends on combining and/or comparing information derived from multiple images. Thus, the level of precision and reliability achieved for Z-height measurements is often less than that achieved for the X and Y measurement axes, where measurements are typically based on feature relationships within a single image. Techniques that may improve or otherwise enhance the accuracy, precision and/or reliability achieved for Z-height measurements for points on a workpiece surface would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A metrology system is provided including an objective lens portion, a light source, a pattern projection portion, a camera, one or more processors, and a memory. The objective lens portion includes an objective lens selected from a set of objective lenses, wherein each of the objective lenses in the set has a different magnification and a cutoff frequency, and a magnification state of the metrology system is configured to be changed by changing the objective lens that is included in the objective lens portion. The pattern projection portion includes a pattern component with a pattern, wherein at least a majority of the area of the pattern comprises a plurality of pattern portions that are not recurring at regular intervals across the pattern, and wherein light from the light source is configured to be transmitted toward the pattern to form pattern light that is transmitted through the objective lens to form a projected pattern on a workpiece surface, and for which the objective lens is configured to input image light arising from the workpiece surface including the projected pattern and transmit the image light along an imaging optical path. The camera is configured to receive image light transmitted along the imaging optical path and provide images of the workpiece surface including the projected pattern. The memory is coupled to the one or more processors and stores program instructions that when executed by the one or more processors cause the one or more processors to at least: control the light source to transmit light toward the pattern to form the projected pattern on the workpiece surface; utilize the camera to acquire an image stack comprising a plurality of images of the workpiece surface with the projected pattern, wherein each image of the image stack corresponds to a different Z-height; and determine focus curve data based at least in part on an analysis of the images of the image stack, wherein the focus curve data indicates 3 dimensional positions of a plurality of surface points on the workpiece surface.

According to another aspect, the plurality of pattern portions of the pattern correspond to spatial frequencies that are below the highest cutoff frequency of the objective lenses in the set of objective lenses. According to another aspect, the set of objective lenses comprises a lowest magnification lens that corresponds to a lowest magnification of the set, a highest magnification lens that corresponds to a highest magnification of the set, and a plurality of intermediate magnification lenses that each correspond to a respective intermediate magnification that are each between the lowest and highest magnifications, and for which the highest magnification is at least 10 times the lowest magnification. In various implementations, at least some of the objective lenses of the set of objective lenses each correspond to respective magnifications of at least one of 0.5×, 1×, 2×, 2.5×, 5×, 10×, 20×, 25×, 50×, or 100×.

According to another aspect, the system further includes a turret with a plurality of turret lenses, for which each turret lens corresponds to a different magnification, and the turret is configured to position one of the turret lenses in the imaging optical path. In various implementations, the turret may have at least first, second and third turret lenses, wherein the second turret lens corresponds to a magnification that is at least 2× the magnification of the first turret lens, and the third turret lens corresponds to a magnification that is at least 4× the magnification of the first turret lens, and the turret is configured to position one of the turret lenses in the imaging optical path.

According to another aspect, each of the plurality of surface points on the workpiece surface corresponds to a region of interest in each of the images of the image stack and the determining of the focus curve data comprises determining focus curve data for each of the regions of interest based at least in part on an analysis of the images of the image stack, wherein for each of the surface points a peak of the focus curve data for the corresponding region of interest indicates a corresponding Z-height of the surface point and for which the peak at least partially results from contrast provided by pattern portions of the projected pattern.

According to another aspect, the pattern portions comprise darker pattern portions and lighter pattern portions. In various implementations, the total amount of area of the pattern corresponding to the darker pattern portions and the total amount of area of the pattern corresponding to the lighter pattern portions are nominally equal (e.g., at approximately a 50/50 ratio of the pattern). In various implementations, the lighter pattern portions correspond to spacings between the darker pattern portions. In various implementations, the pattern is formed on the pattern component with a chrome on glass type process.

In various implementations, the pattern portions comprise pattern portions that are of different sizes. In various implementations, the different sized pattern portions comprise at least first, second, third and fourth sized pattern portions, for which the second, third and fourth sized pattern portions each have a dimension (e.g., a length) that is at least two, three or four times, respectively, as large as a corresponding dimension of the first sized pattern portion. In various implementations, the different sized pattern portions further comprise at least fifth, sixth, seventh and eighth sized pattern portions, for which the fifth, sixth, seventh and eighth sized pattern portions each have a dimension that is at least five, six, seven or eight times, respectively, as large as a corresponding dimension of the first sized pattern portion.

In various implementations, a largest pattern portion of the plurality of pattern portions is less than twenty times the size of a smallest pattern portion of the plurality of pattern portions. In various implementations, a first sized pattern portion is a smallest pattern portion of the plurality of pattern portions and has an area that is at least 2 microns by 2 microns and is at most 20 microns by 20 microns. In various implementations, the camera comprises a pixel array for which the pixels each have an area that is at least at least 2 microns by 2 microns and is at most 20 microns by 20 microns.

In various implementations, adjacent darker and lighter pattern portions of the plurality of pattern portions are in sequences that are not recurring at regular adjacent intervals across the pattern in either x-axis or y-axis directions of the pattern. In various implementations, the pattern may include rows and columns of pattern elements (e.g., wherein the rows and columns may extend in the x-axis and y-axis directions, respectively). In various implementations, each of the darker pattern portions may consist of one or more darker pattern elements (e.g., as each included in a corresponding row and column of the pattern). Similarly, each of the lighter pattern portions (e.g., which may correspond to spacings between the darker pattern portions) may consist of one or more lighter pattern elements (e.g., as each included in a corresponding row and column of the pattern). In various implementations, at least a majority of the area of the pattern comprises at least one of rows or columns of the pattern which include a plurality of pattern portions that are not recurring at regular intervals across the respective rows or columns of the pattern. In various implementations, for at least a majority of the rows or columns of the pattern, all or part of each respective row or column may be unique as including a unique sequence of darker and lighter pattern portions (e.g., of respective sizes) that extends across either all or part of the respective row or column (e.g., and that is not repeated in other rows or columns of the pattern).

According to another aspect, the pattern projection portion further includes a pattern positioning portion configured to be controlled to position the pattern component in an optical path between the light source and the objective lens.

A method for operating a metrology system is provided. The method includes controlling the light source to transmit light toward the pattern included in the optical path with the objective lens to form a projected pattern on the workpiece surface, wherein at least a majority of the area of the projected pattern comprises a plurality of pattern portions that are not recurring at regular intervals across the pattern. The camera is utilized to acquire an image stack comprising a plurality of images of the workpiece surface with the projected pattern, wherein each image of the image stack corresponds to a different Z-height. Focus curve data is determined based at least in part on an analysis of the images of the image stack. The focus curve data is utilized to determine 3 dimensional positions of a plurality of surface points on the workpiece surface. In various implementations, the plurality of pattern portions of the projected pattern correspond to spatial frequencies that are below the highest cutoff frequency of the objective lenses in the set of objective lenses. According to another aspect, the method further includes controlling the pattern positioning portion to position the pattern component in the optical path between the light source and the objective lens.

In various implementations, the objective lens included in the objective lens portion is a first objective lens that has a first cutoff frequency and the projected pattern is a first projected pattern that is at least partially filtered by the first cutoff frequency and the plurality of pattern portions are a first plurality of pattern portions, and the method further includes changing the magnification state of the metrology system by changing the objective lens that is included in the objective lens portion to be a second objective lens that has a second cutoff frequency that is different than the first cutoff frequency. The light source is controlled to transmit light toward the pattern included in the optical path with the second objective lens to form a second projected pattern on the workpiece surface, wherein the second projected pattern is at least partially filtered by the second cutoff frequency and at least a majority of the area of the second projected pattern comprises a second plurality of pattern portions that are not recurring at regular intervals across the pattern, and for which the second plurality of pattern portions is different than the first plurality of pattern portions due at least in part to the different filtering by the first and second cutoff frequencies. The camera is utilized to acquire a second image stack comprising a second plurality of images of the workpiece surface with the second projected pattern, wherein each image of the second image stack corresponds to a different Z-height. Second focus curve data is determined based at least in part on an analysis of the images of the second image stack. The second focus curve data is utilized to determine 3 dimensional positions of a plurality of surface points on the workpiece surface.

In various implementations, a pattern projection portion is provided for use with a metrology system and includes a pattern component and a pattern positioning portion. The pattern component includes a pattern, wherein at least a majority of the area of the pattern comprises a plurality of pattern portions that are not recurring at regular intervals across the pattern. The pattern positioning portion is configured to position the pattern component in an optical path between the light source and the objective lens. After the pattern component is positioned in the optical path, light from the light source is configured to be transmitted toward the pattern to form pattern light that is transmitted through the objective lens to form a projected pattern on the workpiece surface, and for which the objective lens is configured to input image light arising from the workpiece surface including the projected pattern and transmit the image light along the imaging optical path and for which the camera is configured to receive the image light transmitted along the imaging optical path and capture an image stack comprising a plurality of images of the workpiece surface with the projected pattern, wherein each image of the image stack corresponds to a different Z-height and for which the images are configured to be analyzed to determine focus curve data that indicates 3 dimensional positions of a plurality of surface points on the workpiece surface. In various implementations, the plurality of pattern portions of the pattern correspond to spatial frequencies that are below the highest cutoff frequency of the objective lenses in the set of objective lenses.

DETAILED DESCRIPTION

Figure 1:
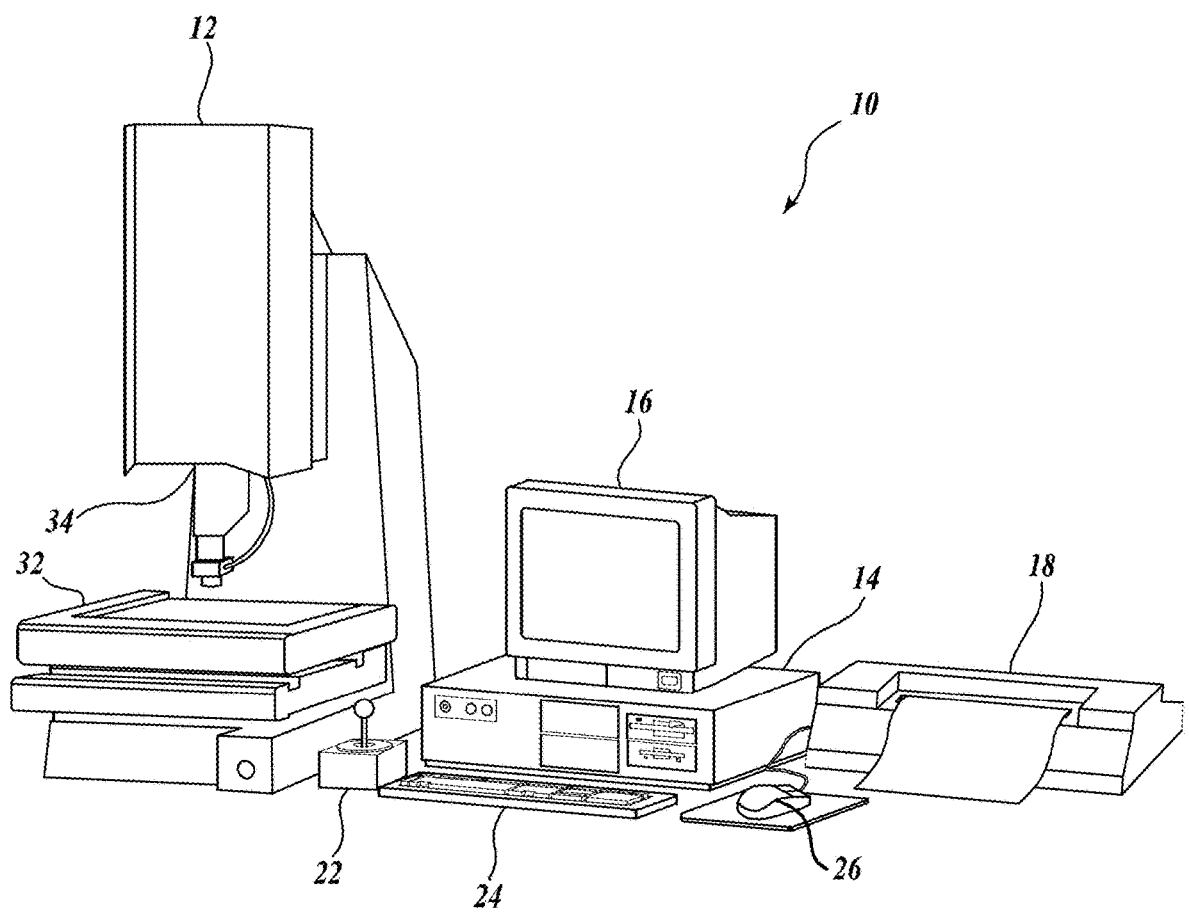
FIG. 1 is a diagram showing various typical components of a general-purpose precision machine vision inspection system.

FIG. 1 is a block diagram of one exemplary machine vision inspection system 10 usable as a metrology system and/or an imaging system in accordance with principles described herein. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that in various implementations, a touchscreen tablet or other computing elements or the like may be substituted for and/or redundantly provide the functions of any or all of the elements 14, 16, 22, 24 and 26.

Those skilled in the art will appreciate that the controlling computer system 14 may generally be implemented using any suitable computing system or device, including distributed or networked computing environments, and the like. Such computing systems or devices may include one or more general-purpose or special-purpose processors (e.g., non-custom or custom devices) that execute software to perform the functions described herein. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable objective lenses. The zoom lens or interchangeable objective lenses generally provide various magnifications for the images provided by the optical imaging system 34. Various implementations of the machine vision inspection system 10 are also described in U.S. Pat. Nos. 7,454,053; 7,324,682; 8,111,905; and 8,111,938, each of which is hereby incorporated herein by reference in its entirety.

Figure 2:
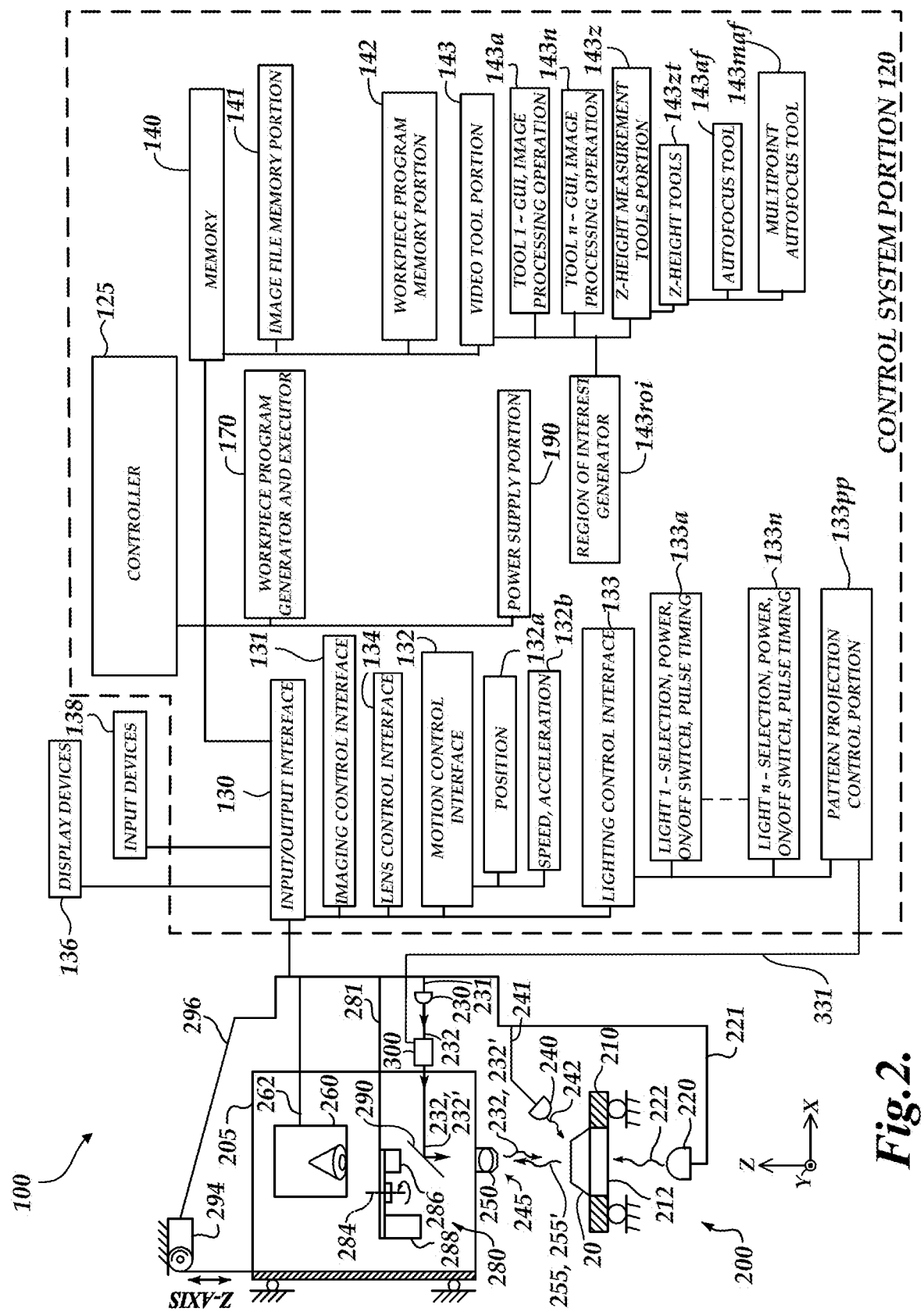
FIG. 2 is a block diagram of a control system portion and a vision components portion of a machine vision inspection system similar to that of FIG. 1 and including a pattern projection portion.

FIG. 2 is a block diagram of a control system portion 120 and a vision components portion 200 of a machine vision inspection system 100 (i.e., a type of metrology system) similar to the machine vision inspection system of FIG. 1, including certain features disclosed herein. As will be described in more detail below, the control system portion 120 is utilized to control the vision components portion 200 and a pattern projection portion 300. The control system portion 120 may be arranged to exchange data and control signals with both the vision components portion 200 and the pattern projection portion 300. The vision components portion 200 includes an optical assembly portion 205, light sources 220, 230, 240, and a workpiece stage 210 having a central transparent portion 212. The workpiece stage 210 is controllably movable along x- and y-axes that lie in a plane that is generally parallel to the surface of the stage where a workpiece 20 may be positioned.

The optical assembly portion 205 includes a camera system 260 and an interchangeable objective lens 250 included in an objective lens portion 245. In some implementations, the optical assembly portion 205 may optionally include a variable focal length (VFL) lens 270, e.g., a tunable acoustic gradient (TAG) such as that disclosed in U.S. Pat. No. 9,143,674, which is hereby incorporated herein by reference in its entirety.

In various implementations, the optical assembly portion 205 may further include a turret lens assembly 280 having lenses 286 and 288. As an alternative to the turret lens assembly, in various implementations a fixed or manually interchangeable magnification-altering lens, or a zoom lens configuration, or the like, may be included. In various implementations, the interchangeable objective lens 250 in the objective lens portion 245 may be selected from a set of fixed magnification objective lenses that are included as part of a variable magnification lens portion (e.g., a set of objective lenses corresponding to magnifications such as 0.5×, 1×, 2× or 2.5×, 5×, 10×, 20× or 25×, 50×, 100×, etc. and for which each objective lens has a cutoff frequency).

The optical assembly portion 205 is controllably movable along a z-axis that is generally orthogonal to the x- and y-axes by using a controllable motor 294 that drives an actuator to move the optical assembly portion 205 along the z-axis to change the focus of the image of the workpiece 20. The controllable motor 294 is connected to an input/output interface 130 via a signal line 296, as will be described in more detail below, to change the focus of the image (e.g., to change the focus position of the objective lens 250 relative to the workpiece 20). The workpiece 20 may be located on the workpiece stage 210. The workpiece stage 210 may be controlled to move relative to the optical assembly portion 205, such that the field of view of the interchangeable objective lens 250 moves between locations on the workpiece 20, and/or among a plurality of workpieces 20.

One or more of a stage light source 220, a coaxial light source 230, and a surface light source 240 (e.g., a ring light) may emit source light 222, 232, and/or 242, respectively, to illuminate the workpiece or workpieces 20. For example, during an image exposure, the coaxial light source 230 may emit source light 232 along a path including a beam splitter 290 (e.g., a partial mirror). The source light 232 is reflected or transmitted from the workpiece 20 as image light 255, and the image light used for imaging passes through the interchangeable objective lens 250 and the turret lens assembly 280 and is gathered by the camera system 260. A workpiece image exposure which includes the image of the workpiece(s) 20, is captured by the camera system 260 (e.g., including a pixel array), and is output on a signal line 262 to the control system portion 120.

Various light sources (e.g., the light sources 220, 230, 240) may be connected to a lighting control interface 133 of the control system portion 120 through associated signal lines (e.g., the busses 221, 231, 241, respectively). The control system portion 120 may control the turret lens assembly 280 to rotate along axis 284 to select a turret lens (e.g., having a magnification of 1×, 2×, 4×, or 6×, etc.) through a signal line or bus 281 to alter an image magnification.

As shown in FIG. 2, in various exemplary implementations, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, and the lens control interface 134.

The lighting control interface 133 may include lighting control elements 133a-133n, that control, for example, the selection, power, and on/off switch for the various corresponding light sources of the machine vision inspection system 100. The lighting control interface 133 also includes a pattern projection control portion 133pp that, in the illustrated implementation, works in conjunction with the pattern projection portion 300 to provide a projected pattern during image acquisitions as described in greater detail below. Briefly, the pattern projection portion 300 is controllable to move a pattern into or out of the path of the source light 232. If the pattern is not positioned in the path of the source light 232, the source light 232 travels as described above for reflecting from the surface of the workpiece 20 as image light 255. If the pattern is positioned in the path of the source light 232, then the source light 232 is transmitted or reflected from the pattern to become pattern light 232' which is reflected by the beamsplitter 290 to be directed through the objective lens 250 to form the projected pattern on the surface of the workpiece 20. The reflected image light 255' (i.e., including the projected pattern) from the surface of the workpiece 20 passes through the interchangeable objective lens 250 and the turret lens assembly 280 and is gathered by the camera system 260. A workpiece image exposure which includes the image of the workpiece(s) 20 with the projected pattern, is captured by the camera system 260 (e.g., including a pixel array of the camera system 260), and is output on a signal line 262 to the control system portion 120, and is further processed as will be described in more detail below.

The memory 140 may include an image file memory portion 141, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. Examples of the operations of such video tools for locating edge features and performing other workpiece feature inspection operations are described in more detail in certain of the previously incorporated references, as well as in U.S. Pat. No. 7,627,162, which is hereby incorporated herein by reference in its entirety.

The video tool portion 143 also includes an autofocus video tool 143af that determines the GUI, image-processing operation, etc., for focus height measurement operations. In various implementations, the autofocus video tool 143af may additionally include a high-speed focus height tool that may be utilized to measure focus heights with high speed, as described in more detail in U.S. Pat. No. 9,143,674, which is hereby incorporated herein by reference in its entirety. In various implementations, the high-speed focus height tool may be a special mode of the autofocus video tool 143af that may otherwise operate according to conventional methods for autofocus video tools, or the operations of the autofocus video tool 143af may only include those of the high-speed focus height tool. High-speed autofocus and/or focus position determination for an image region or regions of interest may be based on analyzing the image to determine a corresponding quantitative contrast metric for various regions, according to known methods. For example, such methods are disclosed in U.S. Pat. Nos. 8,111,905; 7,570,795; and 7,030,351, each of which is hereby incorporated herein by reference in its entirety.

In the context of this disclosure, and as is known by one of ordinary skill in the art, the term "video tool" generally refers to a relatively complex set of automatic or programmed operations that a machine vision user can implement through a relatively simple user interface. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. It should be noted that the visible user interface features are sometimes referred to as the video tool, with the underlying operations being included implicitly.

One or more display devices 136 (e.g., the display 16 of FIG. 1) and one or more input devices 138 (e.g., the joystick 22, keyboard 24, and mouse 26 of FIG. 1) may be connected to the input/output interface 130. The display devices 136 and input devices 138 may be used to display a user interface that may include various graphical user interface (GUI) features that are usable to perform inspection operations, and/or to create and/or modify part programs, to view the images captured by the camera system 260, and/or to directly control the vision components portion 200.

In various exemplary implementations, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a run mode workpiece, or workpieces, which matches the representative workpiece used when creating the part program. In some implementations, such techniques may be utilized to create a part program instruction for analyzing a reference object image, to provide functions and operations described in more detail below.

The video tool portion 143 also includes Z-height measurement tools portion 143z, which provides various operations and features related to Z-height measurement operations, as described in greater detail below. In one implementation, the Z-height measurement tools portion 143z may include Z-height tools 143zt. The Z-height tools 143zt may include an autofocus tool 143af, and a multipoint autofocus tool 143maf, for example. The Z-height tools 143zt may govern certain aspects of image stack acquisition and related pattern projection operations and processing in conjunction with the Z-height tools that are configured in a mode that determines best focus heights and/or Z-height measurements (e.g., as part of points from focus type operations) based on techniques described further below.

Briefly, the Z-height measurement tools portion 143z may perform at least some operations similarly to known Z-height measurement tools, for example, performing operations in learn mode and run mode for generating all or parts of focus curves, and finding peaks as best focus positions, etc. Additional Z-height measurement tool operations which correspond to principles and operations as disclosed herein may also be performed. For example, in various implementations the autofocus tool 143af and/or other Z-height tool of the Z-height tools 143zt may be selected and utilized by a user for performing a points-from-focus (PFF) type process on a workpiece surface, including controlling the pattern projection control portion 133pp for projecting a pattern on the workpiece surface and capturing an image stack for determining 3 dimensional positions (i.e., including Z-heights) of a plurality of surface points on the workpiece surface.

Figure 3:
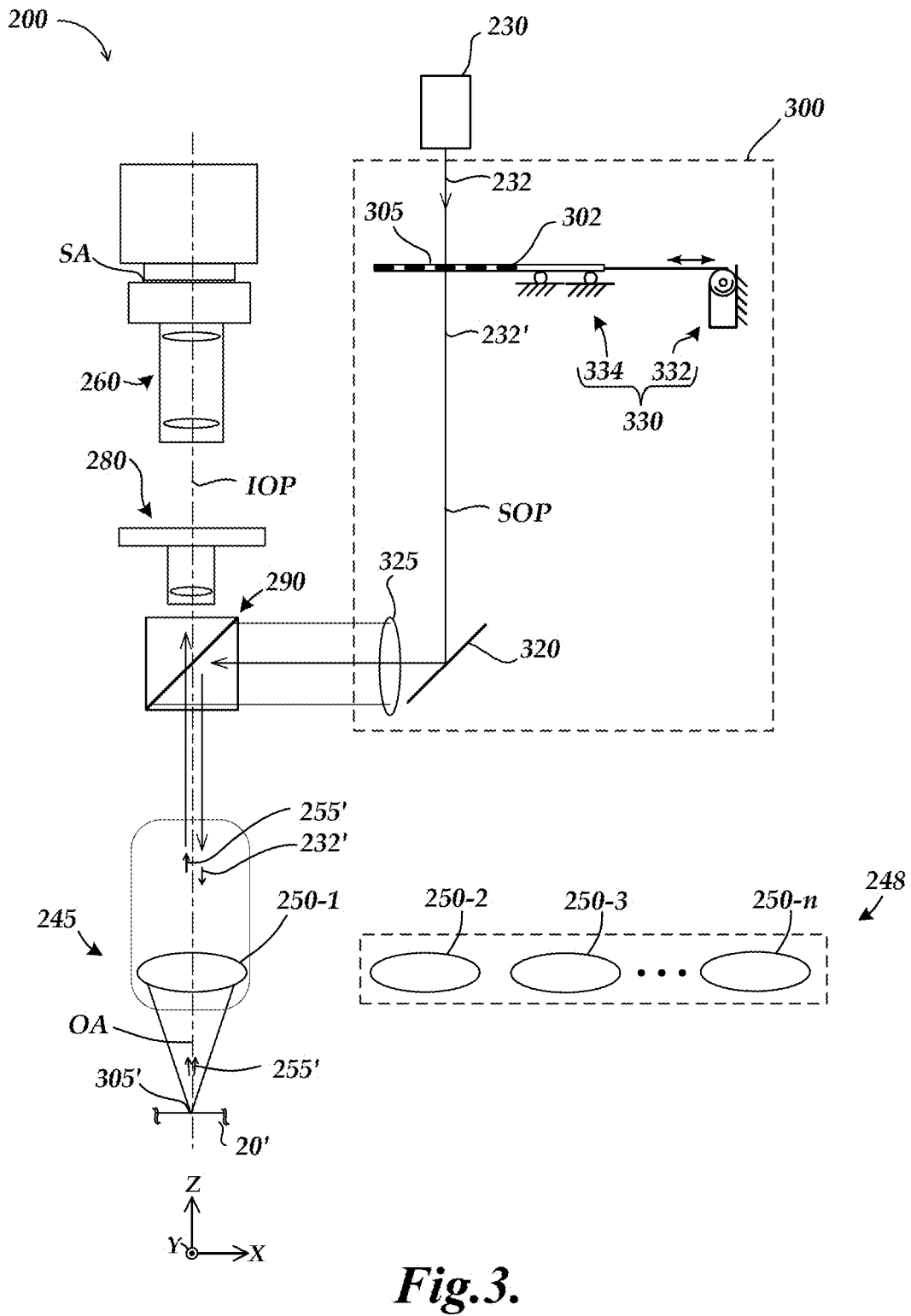
FIG. 3 is a block diagram including one exemplary implementation of the pattern projection portion shown in FIG. 2.

FIG. 3 is a block diagram showing a portion of the vision system components portion 200 of FIG. 2 and including additional details of one exemplary implementation of the pattern projection portion 300, in accordance with certain principles disclosed herein. As illustrated in FIG. 3, an objective lens portion 245 includes an objective lens 250-1 selected from a set of objective lenses 248, wherein each of the objective lenses in the set (e.g., objective lenses 250-1, 250-2, 250-3, . . . 250-n) has a different magnification and spatial resolution, or in other words, a cutoff frequency (e.g., for which the different objective lenses 250 may each have a different cutoff frequency). A magnification state of the vision components portion 200 (e.g., an optical system including optics) of the metrology system 100 is configured to be changed by changing the objective lens 250 that is included in the objective lens portion 245 (e.g., which may also change a corresponding cutoff frequency of the system in accordance with the objective lens that is selected). In various implementations, the set 248 of interchangeable objective lenses 250 (e.g., fixed magnification objective lenses) may each correspond to different magnifications (e.g., including at least some of 0.5×, 1×, 2×, 2.5×, 5×, 7.5×, 10×, 20×, 25×, 50×, 100×, etc.)

The pattern projection portion 300 includes a pattern component 302, a pattern positioning portion 330, a turning mirror 320 and a projection lens 325. The pattern component 302 includes a pattern 305 (e.g., formed from a chrome on glass process or other fabrication method). As will be described in more detail below with respect to FIGS. 8 and 9, in various implementations at least a majority (e.g., 50% or more) of the area of the pattern 305 may comprise a plurality of pattern portions that are not recurring at regular intervals across the pattern. In operation, such configurations may provide a broad spectrum of spatial frequencies in the power spectrum, as may be advantageous when used with different objective lenses 250 of the set 248 which may each have a different cutoff frequency. More specifically, as will be described in more detail below, even if some frequency content is filtered by the cutoff frequency of some of the objective lenses, some range of lower frequencies may still make it through those objective lenses so as to be present in the projected pattern and provide sufficient contrast so that accurate/reliable focus curve data may be obtained.

The pattern positioning portion 330 includes a controllable motor 332 and a set of rollers 334. The controllable motor 332 (e.g., as controlled by a control signal from the pattern projection control portion 133pp or otherwise) drives an actuator to move the pattern component 302 with the pattern 305 into or out of the source optical path SOP between the light source 230 and the objective lens 250-1. In operation, once the pattern positioning portion 330 has been controlled to position the pattern component 302 with the pattern 305 into the source optical path SOP, the light source 230 is controlled to transmit light through the pattern 305 to form the projected pattern 305' on the workpiece surface of the workpiece 20. More specifically, source light 232 from the light source 230 is transmitted through the pattern 305 to form pattern light 232' that is transmitted along the source optical path SOP which includes the turning mirror 320, the projection lens 325, the beamsplitter 290, and the objective lens 250-1. In particular, the pattern light 232' is reflected by the turning mirror 320 and passes through the projection lens 325 and is reflected by the beamsplitter 290 to pass through the objective lens 250-1 to form the projected pattern 305' on the surface of the workpiece 20'. The objective lens 250-1 inputs image light 255' arising from the workpiece surface including the projected pattern 305' and transmits the image light 255' along an imaging optical path IOP (i.e., which includes the image light 255' passing through the beamsplitter 290 and a lens of the turret 280 to the camera 260). The camera 260 receives the image light 255' transmitted along the imaging optical path IOP (i.e., which in the illustrated example also corresponds to an optical axis OA of the vision components portion 200 as corresponding to the optical axis of the objective lens 250-1) and provides images of the surface of the workpiece 20' including the projected pattern. The camera 260 includes a sensor SA (e.g., including a pixel array as will be described in more detail below).

As will be described in more detail below with respect to FIGS. 4A and 4B, in various implementations (e.g., as part of a points from focus type process) the camera 260 is utilized to acquire an image stack comprising a plurality of images of the workpiece surface with the projected pattern, wherein each image of the image stack corresponds to a different Z-height. Focus curve data (e.g., for which the projected pattern contributes contrast) is determined based at least in part on an analysis of the images of the image stack, wherein the focus curve data indicates 3 dimensional positions (e.g., including Z-heights as well as relative x-axis and y-axis positions) of a plurality of surface points on the workpiece surface.

It will be appreciated that in the illustrated system the pattern projection optics include projection and imaging optics. In general, in the vision system components portion 200 of the system 100 there are at least three different clear apertures that fundamentally limit the frequencies that can be imaged, including that of the projection lens 325, the objective lens 250 and the lens of the turret 280 (e.g., also referenced as a tube lens which may be lens 286 or 288, and/or other lens included in the turret 280). As described herein, in certain implementations it may be the characteristics of the different objective lenses 250 and the corresponding cutoff frequencies that may be particularly relevant. In some implementations, the projection lens 325 may also have a cutoff frequency that is relevant, and that may similarly be included in the relevant system determinations (e.g., for the minimum pattern element size, etc.) as discussed herein. It will be appreciated that in the system 100, in various implementations the turret lenses 280 may be physically located just in front of the camera 260, and are in the imaging optical path IOP after the objective lens 250, and may not significantly alter the frequency spectra of the imaging system, although in other implementations the lenses of the turret 280 may play a larger role and for which the characteristics (e.g., cutoff frequencies, etc.) may also be included in the relevant system determinations.

Figures 4A, 4B:
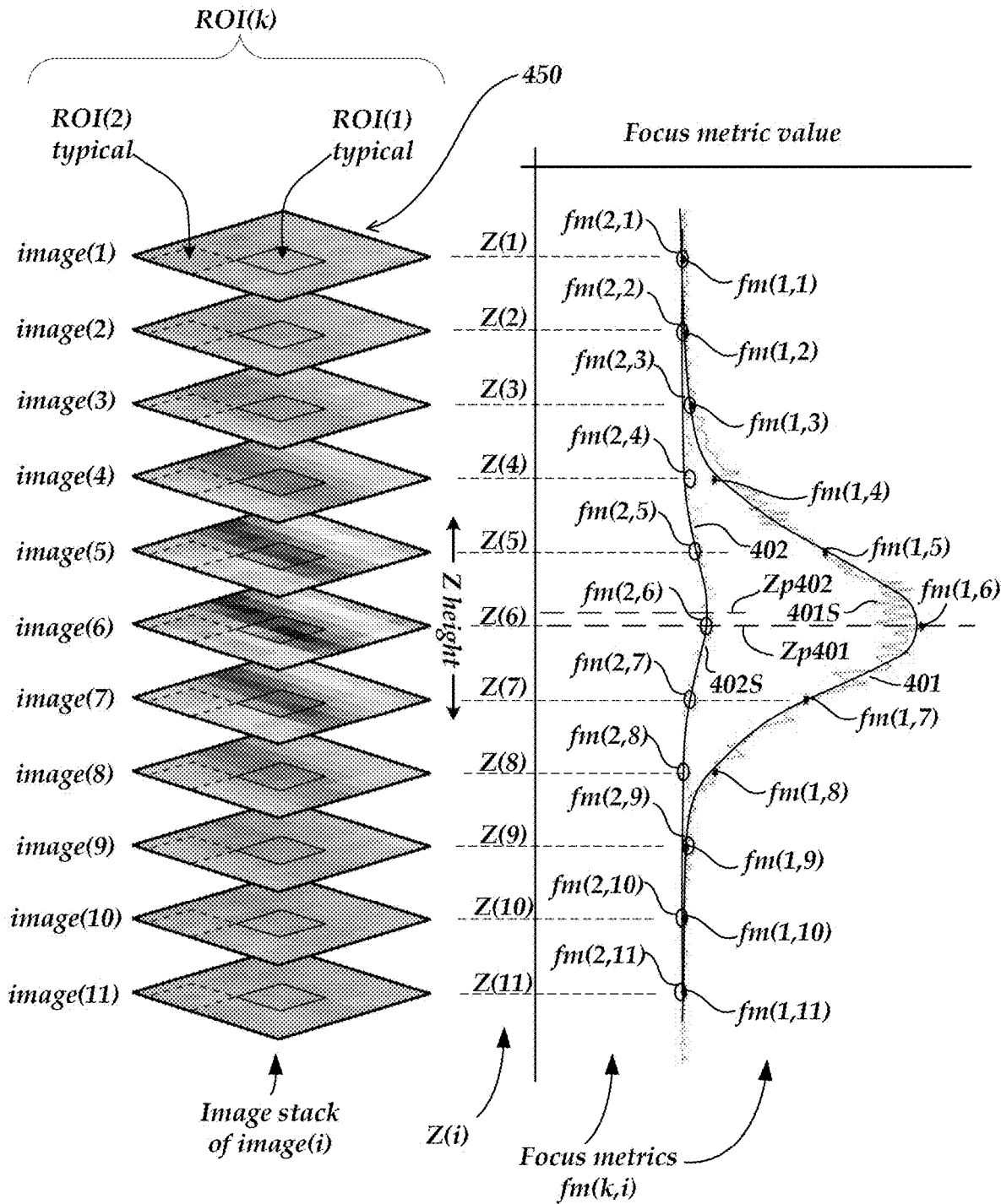
FIGS. 4A and 4B are diagrams illustrating contrast focus curves as may result from characteristics of a projected pattern in corresponding regions of interest.

FIGS. 4A and 4B are diagrams illustrating contrast focus curves 401 and 402 as may result from characteristics of a projected pattern in corresponding regions of interest. In accordance with principles disclosed herein, it is generally desirable for a projected pattern to provide sufficient contrast so that the peak of a contrast curve can be accurately localized and reliably distinguished from noise for all desired regions of interest. As will be described in more detail below, focus curve data may be determined from analysis of an image stack (e.g., as part of points-from-focus (PFF) type processes/measurement operations), which indicates 3-dimensional positions of surface points on the surface of the workpiece.

FIGS. 4A and 4B illustrate how an image stack obtained by the system 100 (e.g., including the pattern projection portion 300) may be utilized to determine the Z-heights of points on a workpiece surface. In various implementations, the image stack is obtained by the system 100 operating in a points-from-focus (PFF) mode (or similar mode), to determine Z-heights of points on the workpiece surface. The PFF image stack may be processed to determine or output a Z-height coordinate map (e.g. a point cloud) that quantitatively indicates a set of 3 dimensional surface coordinates (e.g., corresponding to a surface shape or profile of the workpiece).

In the PFF type analysis as described herein, each of the focus curves 401 and 402 (as shown in FIG. 4A) corresponds to a single point on the workpiece surface. That is, the peak of each focus curve indicates the Z-height of the single point along the direction of the optical axis OA of the vision components portion 200 of the system 100. In various implementations, the PFF type analysis repeats this process for multiple surface points (e.g., each with a corresponding region of interest) across the workpiece surface such that an overall profile of the workpiece surface can be determined. In general, the process may be performed for the multiple surface points that are within a field of view (i.e., as captured within the images of the image stack), where for each image of the image stack, a particular ROI(i) corresponds to a particular point on the workpiece surface (e.g., with the point at the center of the ROI).

FIGS. 4A and 4B are aligned relative to one another along the Z-height axis shown in the figures. FIG. 4A is a representative graph 400A illustrating two examples of fit focus curves 401 and 402, and FIG. 4B is a diagram of a variable focus image stack 400B which includes two different regions of interest ROI(k), in particular ROI(1) and ROI(2), that correspond to the data points fm(1,i) and fm(2,i) corresponding to the two different focus curves 401 and 402, respectively, of FIG. 4A. The regions of interest ROI(k) are included in an imaged surface region of a workpiece.

Regarding the term "region of interest", it will be appreciated that some "single point" autofocus tools return a single Z-height corresponding to an entire region of interest. However, known "multi-point" type autofocus tools may return multiple Z-heights corresponding to individual "sub-regions of interest" (e.g. a grid of sub-regions of interest) within a global region of interest defined by the multi-point type autofocus tool. For example, such sub-regions of interest may be manually and/or automatically defined as centered on each (or most) pixels within the global region of interest. Thus, in some cases, ROI(1) and ROI(2) may be regarded as representative sub-regions of interest within a global region of interest. However, the essential point is that a Z-height may be established for any defined autofocus region of interest, whether it is a region of interest of a single point autofocus tool, or a sub-region of interest within a global region of interest defined by a multi-point autofocus tool. Thus, it will be understood that when the term region of interest is used in relation to establishing a Z-height, that sub-regions of interest (e.g. within a global region of interest defined by a multi-point autofocus tool) may be encompassed within the meaning of that term. For simplicity of the current illustrations, the regions of interest ROI(1) and ROI(2) are shown to be relatively small (e.g. 3×3 pixels), although it will be appreciated that larger regions of interest (e.g., 7×7 pixels, etc.) may be utilized in various implementations as part of such processes, etc.

As shown in FIG. 4B, each of the images image(1)-image(11) of the image stack image(i) include the centrally located region of interest ROI(1) for which the determined focus metric values correspond to the focus metric data points fm(1,*i*) on the focus curve 401. The region of interest ROI(1) is schematically indicated in FIG. 4B as including a relatively high level of contrast (e.g. in image (6)), corresponding to the relatively greater focus metric values shown on the focus curve 401. Similarly, each of the images image(1)-image(11) of the image stack image(i) include the peripherally located region of interest ROI(2) for which the determined focus metric values correspond to the focus metric data points fm(2,*i*) on the focus curve 402. The region of interest ROI(2) is schematically indicated in FIG. 4B as including a relatively low level of contrast (e.g. in image(6)), corresponding to the relatively lesser focus metric values shown on the focus curve 402.

As shown in FIG. 4A, each focus metric value fm(1,*i*) or fm(2,*i*) may be regarded as sampling continuous underlying focus data 401S or 402S, respectively. It may be seen in FIG. 4A that the underlying focus data 401S or 402S is relatively noisy (e.g. due to the small size of the corresponding regions of interest). However, in the case of the focus curve 401, due to higher contrast in the corresponding region of interest the focus metric values in the vicinity of the focus curve peak (e.g. near Zp401) are relatively large compared to the size of the "noise component" in the underlying focus data. In contrast, in the case of the focus curve 402, due to low contrast in the corresponding region of interest the focus metric values in the vicinity of the focus curve peak (e.g. near Zp402) are relatively similar to the size of the "noise component" in the underlying focus data.

In one specific example, the higher focus metric values indicated in the focus curve 401 may be due at least in part to a section of a pattern that is projected on the surface area in the region of interest ROI(1) being "highly textured" and/or otherwise producing high contrast in focused images. In comparison, the lower focus metric values indicated in the focus curve 402 may be due at least in part to a section of a pattern that is projected or partially projected (e.g., partially or fully filtered by a cutoff frequency of a lens) on the surface area in the region of interest ROI(2) having "little texture" and/or otherwise producing little contrast in focused images. In any case, it will be appreciated that because of the low "signal to noise" associated with the lower peak of the focus curve 402, as compared to relatively high signal to noise associated with the peak of the focus curve 401, that the estimated Z-height of the focus peak Zp402 of the focus curve 402 is less reliable or more uncertain than the estimated Z-height of the focus peak Zp401 of the focus curve 401 (e.g., in some instances the data of the focus curve 402 may be considered so unreliable and/or uncertain that no focus peak determination may reliably be made, as may be regarded as corresponding to a "gap" in the focus curve data for the workpiece surface).

It will be appreciated that the contrast areas indicated in the region of interest ROI(1) (e.g., in image(6)) may correspond to pattern portions of a projected pattern on the workpiece surface, for which the pattern portions are of a desired size and arrangement so as to both (a) provide a desirable amount of contrast in the region of interest ROI(1) at the current magnification (e.g., including the magnification of the current lens of the turret 280), and (b) not be filtered by the cutoff frequency of the current selected interchangeable objective lens 250 or other lens of the system. In comparison, the region of interest ROI(2) may be representative of certain issues that may arise when at least part of a pattern does not have such desirable characteristics. For example, the low level of contrast in the region of interest ROI(2) may result from a corresponding section of a pattern in which the pattern portions are of a high spatial frequency that are filtered by the cutoff frequency of the current selected interchangeable objective lens 250, for which little or no of those pattern portions may be visible in the region of interest ROI(2). As another potential issue, the scale/size of the pattern portions may be such that a single pattern portion (e.g., a single darker pattern portion or a single lighter pattern portion) may cover the entire region of interest ROI(2) such that no contrast is available between the different pixels within the region of interest ROI(2).

In accordance with principles disclosed herein, it is desirable to utilize a pattern with characteristics that will result in focus curves similar to focus curve 401 (e.g., with relatively high focus curve peaks), and which may be effectively utilized with different objective lenses with different cutoff frequencies, as well as at various magnifications (e.g., including the magnification of a turret lens, etc.). As will be described in more detail below, such characteristics may include the pattern having a broad range of spatial frequency content, so that even if some of the higher frequency content is filtered/lost for some objective lenses, other lower spatial frequencies (i.e., as corresponding to certain larger pattern portions) may make it through and still be visible in the captured images of the image stack. In some implementations, it may be desirable for the power spectrum of the pattern to be relatively constant (e.g., relatively flat) out to the highest cutoff frequency of the optical projection system (e.g., as defined by the highest cutoff frequency of the objective lenses in a set of objective lenses that may be utilized). In some implementations, it may also be desirable for there to be a relatively limited or smaller number and/or maximum size of larger pattern portions (e.g., larger darker and/or lighter pattern portions corresponding to lower spatial frequencies that are below the lowest cutoff frequency of the set of objective lenses) since such pattern portions may occupy significant area in the pattern and may cover significant numbers of pixels when magnified, etc. As will be described in more detail below, in certain implementations a pseudo random pattern (e.g., such as blue noise, or similar), can appropriately create high frequency texture.

Points from focus type operations (e.g., including autofocus operations, etc.) associated with determining Z-heights for regions of interest have been previously outlined. Briefly summarizing in relation to FIGS. 4A and 4B, a camera may move through a range of Z-height positions Z(i) along a z-axis (e.g., the focusing axis or optical axis OA) and capture an image(i) at each position. For each captured image(i), a focus metric fm(k,i) may be calculated based on a region or sub-region of interest ROI(k) (e.g. a set of pixels) in the image and related to the corresponding position Z(i) of the camera along the Z axis at the time that the image was captured. This results in focus curve data (e.g. the focus metrics fm(k,i) at the positions Z(i), which is one type of focus peak determining data set), which may be referred to simply as a "focus curve" or "autofocus curve". In one embodiment, the focus metric values may involve a calculation of the contrast or sharpness of the region of interest in the image. In various embodiments, the focus values or curves may be normalized. Various focus metric calculation techniques are described in detail in the incorporated references, and various suitable focus metric functions will also be known to one of ordinary skill in the art.

The Z-height (e.g. Zp401 or Zp402) corresponding to the peak of the focus curve, which corresponds to the best focus position along the Z axis, is the Z-height for the region of interest used to determine the focus curve. The Z-height corresponding to the peak of the focus curve may be found by fitting a curve (e.g. the curve 401 or 402) to the focus curve data (e.g. the data fm(1,i) or fm(2,i)) and estimating the location of the peak of the fitted curve. It will be appreciated that while the image stack image(i) is shown for purposes of illustration as only including eleven images, in an actual embodiment (e.g., as part of a PFF type process or otherwise) a larger number of images (e.g. 100 or 200 or more) may be utilized. Exemplary techniques for the determination and analysis of image stacks and focus curves are taught in U.S. Pat. Nos. 6,542,180 and 8,581,162, each of which is hereby incorporated herein by reference in its entirety.

Figure 5:
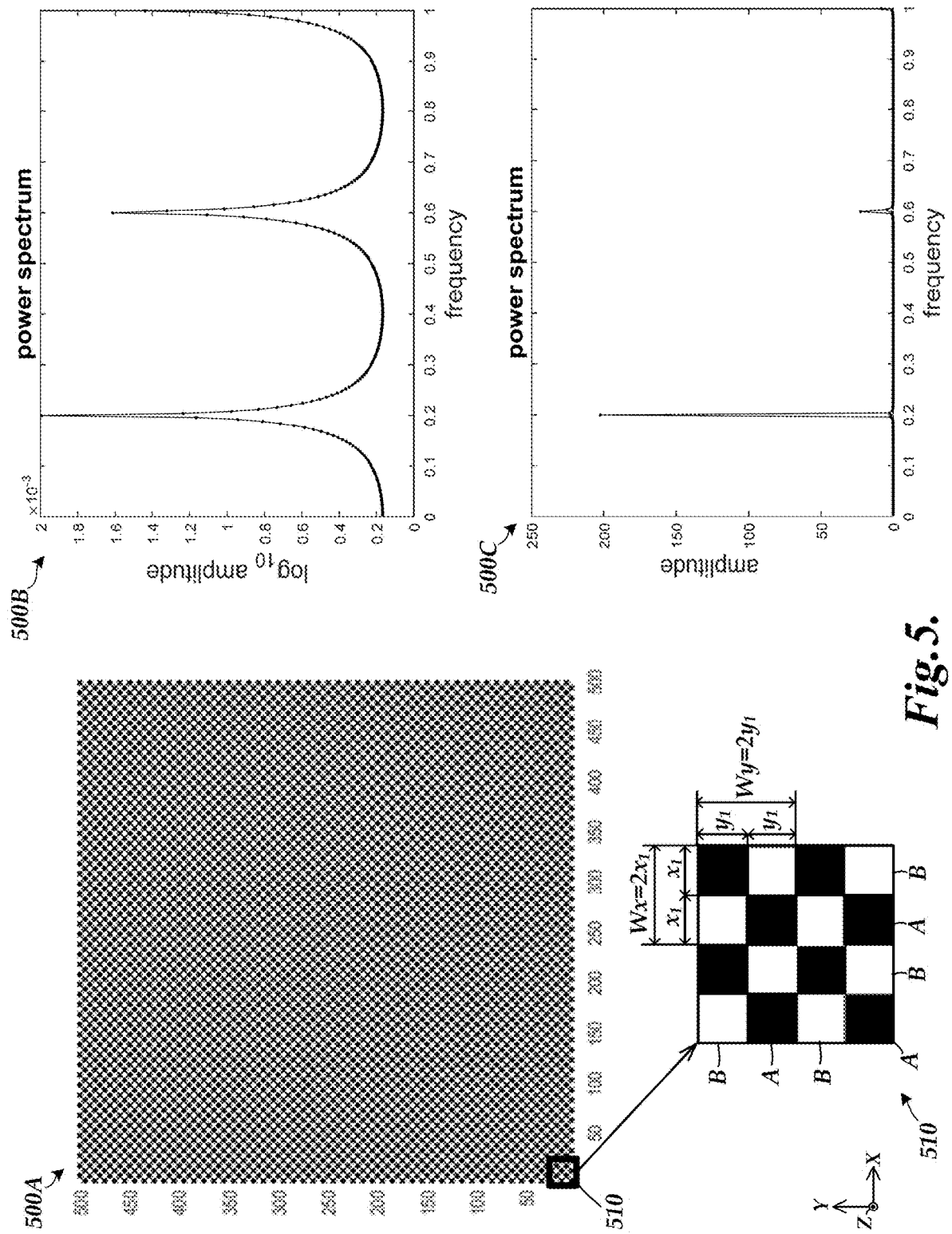
FIG. 5 is a diagram illustrating a checkerboard pattern and corresponding power spectrum graphs.

FIG. 5 is a diagram illustrating a checkerboard pattern 500A and corresponding power spectrum graphs 500B and 500C. As will be described in more detail below, each pattern illustrated herein (e.g., in FIGS. 5-9) is representative of both a pattern on a pattern component (e.g., such as a pattern 305 formed on a pattern component 302 with a chrome on glass or other process) and all or part of a projected pattern (e.g., such as projected pattern 305' as achieved by directing light toward a pattern component to project the pattern onto a workpiece surface and for which corresponding images are captured by a pixel array of a camera). An enlarged section 510 of the checkerboard pattern 500A is illustrated, for which the pattern is shown to include pattern elements A and B, for which pattern elements A are darker pattern elements and pattern elements B are lighter pattern elements. In an implementation formed by a chrome on glass or similar process, the darker pattern elements A may correspond to chrome portions, while the lighter pattern elements B may correspond to spacings between the darker pattern elements A. The pattern elements A and B are each nominally of the same size, each having a dimension $x_1$ along the x axis direction and a dimension $y_1$ along the y axis direction. A corresponding spatial wavelength Wx in the x axis direction is thus equal to $2x_1$, while a spatial wavelength Wy in the y axis direction is thus equal to $2y_1$.

In various implementations, each pattern element A may be designated as a darker pattern portion, and each pattern element B may be designated as a lighter pattern portion, for which in the example of the pattern 500A each pattern portion may have a size of one pattern element. As illustrated, the pattern portions (e.g., corresponding to the pattern elements A and/or B) are recurring at regular intervals across the pattern 500A (e.g., in both the x axis and y axis directions of the pattern 500A). More specifically, the darker and/or lighter pattern portions repeat (e.g., periodically) in regular intervals (e.g., at equally spaced positions) in both the x axis and y axis directions across the entire pattern.

As illustrated in the power spectrum graphs 500B and 500C, the spatial frequency composition of the checkerboard pattern 500A results in only a few frequencies in the power spectrum. More specifically, the power spectrum exhibits spikes at the primary spatial frequency (e.g., the spatial frequency Wx along the x axis direction) of the pattern elements A and B (e.g., with a largest peak occurring at the frequency of 0.2 as corresponding to the spatial wavelength Wx=$2x_1$) and at the higher harmonics. In comparison, a sinusoidal checkerboard pattern may exhibit only a single sharp peak in the power spectrum.

As will be described in more detail below, in general the relatively few frequencies in the power spectrum may be undesirable in relation to various factors. As one such factor, different lenses that may be utilized by the system 100 (e.g., different objective lenses 250) may have different optical cutoff frequencies. For example, a high frequency checkerboard pattern that is below the cutoff frequency of a particular 2.5× magnification objective lens (and is thus appropriate for use with that objective lens), may be above the cutoff frequency for a different magnification lens (e.g., a higher magnification objective lens) with a different optical cutoff frequency, in which case the entire pattern may be filtered such that no pattern may be visible when projected with the higher magnification objective lens.

Figure 6:
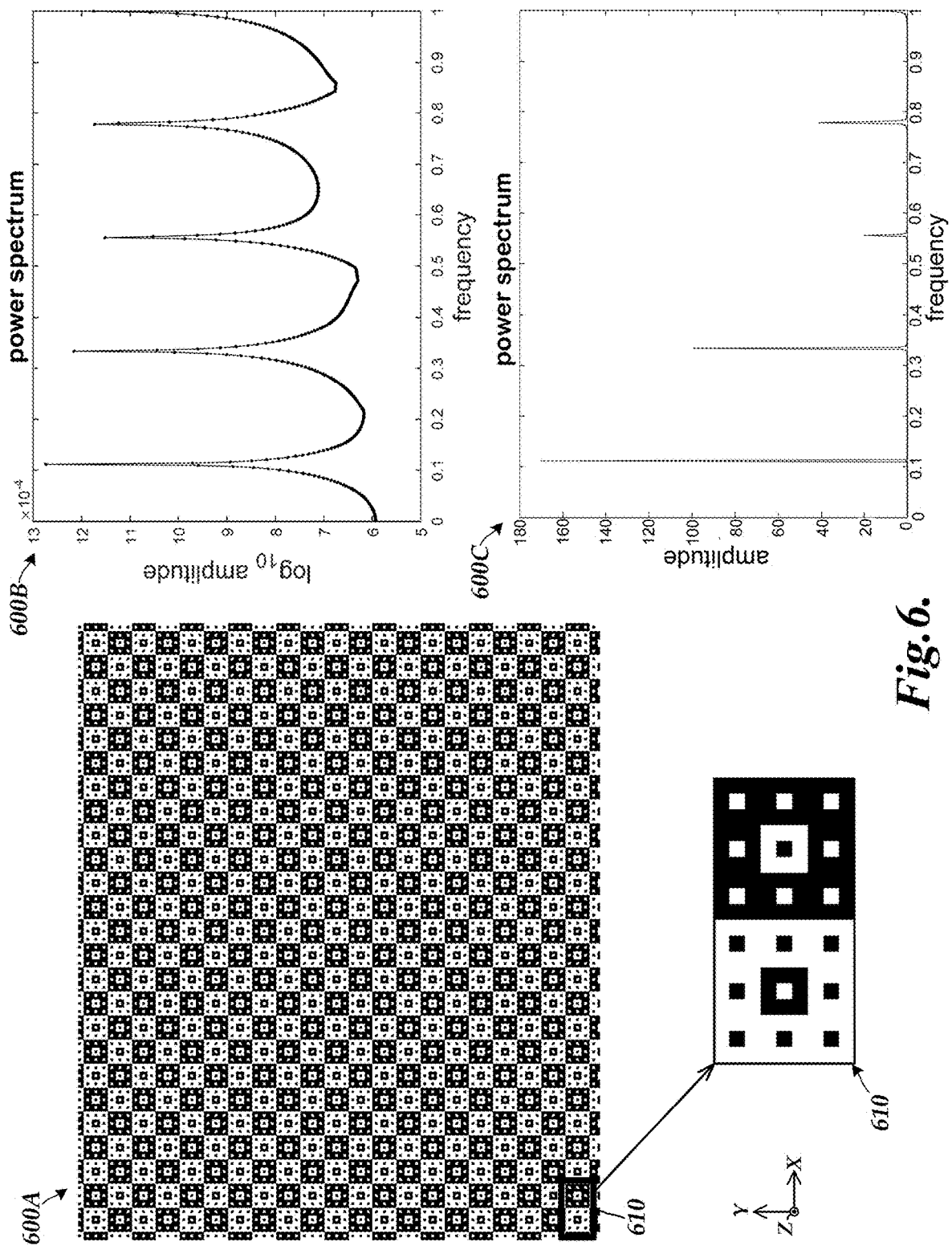
FIG. 6 is a diagram illustrating a section of a three level fractal pattern and corresponding power spectrum graphs.

FIG. 6 is a diagram illustrating a section of a three-level fractal pattern 600A and corresponding power spectrum graphs 600B and 600C. An enlarged section 610 of the pattern 600A is shown to include two types of pattern arrangements, which repeat (e.g., periodically) in regular intervals (e.g., at equally spaced positions) in both the x axis and y axis directions across the entire pattern. As illustrated by the power spectrum graphs 600B and 600C, the pattern 600A has a more diverse power spectrum than the checkerboard pattern 500A, but for which only a few frequencies dominate the spectral range. For the reasons noted above, such characteristics may also be undesirable in certain implementations (e.g., the lowest corresponding spatial frequency of the pattern arrangements shown in section 610 may still be above the cutoff frequency of some objective lenses, etc.).

Figure 7:
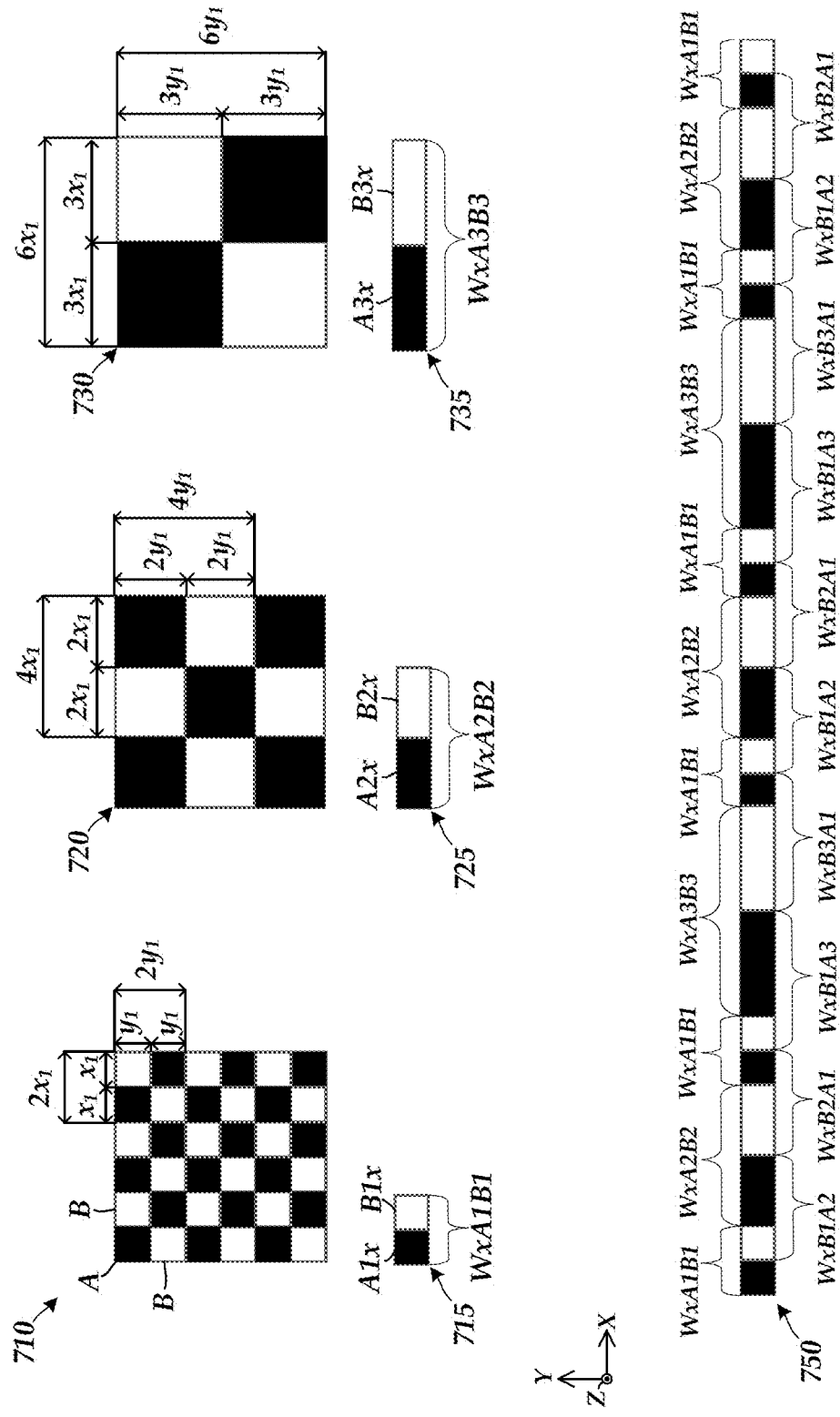
FIG. 7 is a diagram illustrating various principles for pattern portions corresponding to different spatial wavelengths.

FIG. 7 is a diagram illustrating various principles for pattern sections and portions corresponding to different spatial wavelengths and in relation to pixel sizes. As illustrated in FIG. 7, three checkerboard pattern sections 710, 720 and 730 are of equal sizes, but each correspond to different spatial wavelengths. More specifically, the pattern portions in the pattern section 720 are two times as big as those of the pattern section 710, while the pattern portions in the pattern section 730 are three times as big as those in the pattern section 710.

The pattern section 710 includes the checkerboard arrangement of pattern elements A and B, for which the pattern elements A are darker pattern elements, and the pattern elements B are lighter pattern elements. For purposes of illustration, the pattern section 710 may be considered analogous to a corresponding section of the pattern 500A of FIG. 5. The pattern elements A and B are of equal sizes, each having a dimension $x_1$ along the x axis direction and a dimension $y_1$ along the y axis direction. A corresponding spatial wavelength along the x axis direction is thus $2x_1$, while a corresponding spatial wavelength along the y axis direction is thus $2y_1$.

In the pattern section 720 (i.e., for which the pattern portions are twice as big as those of the pattern section 710), each pattern portion has an x axis dimension $2x_1$ and a y axis dimension $2y_1$, for which the corresponding spatial wavelength along the x axis direction is $4x_1$ and the corresponding spatial wavelength along the y axis direction is $4y_1$. In the pattern section 730, (i.e., for which the pattern portions are three times as big as those of the pattern section 710) the pattern portions have dimensions along the x axis direction of $3x_1$, and along the y axis direction of $3y_1$, with corresponding spatial wavelengths along the x axis direction of $6x_1$ and along the y axis direction of $6y_1$.

In relation to potential pixel sizes, in one implementation the pattern section 710 is also representative of a portion of a pixel array, in which each pattern element (e.g., corresponding to the projected pattern on a workpiece surface as imaged by the pixel array of the camera) may be the same size and aligned with a corresponding pixel, for which a pixel array section with 6×6 pixels (i.e., as overlaid by the pattern section 710) is illustrated. In accordance with such a pixel size, the pattern portions of the pattern section 720 may each cover the area of four pixels, while the pattern portions of the pattern section 730 may each cover nine pixels. These comparisons illustrate certain principles in relationship to magnification of a projected pattern (e.g., as magnified by a turret lens, etc.). For example, a magnification of the pattern section 710 by a 2× turret lens would result in projected pattern portions of the size of the pattern portions of the pattern section 720 at a 1× magnification (i.e., thus each covering the area of four pixels in the above example). A 3× magnification of the pattern section 710 (e.g., by a 3× turret lens) would result in projected pattern portions of the size of the pattern portions of the pattern section 730 at a 1× magnification (i.e., for which each pattern portion would cover the area of nine pixels). As will be described in more detail below, such magnifications may create certain issues in relation to desired amounts of contrast between pixels (e.g., for which a pattern portion covering a large group of pixels may prevent desired contrast determinations for pixels in the middle of that group).

As a further illustration of certain principle related to pattern element sizes and spatial frequencies, additional respective pattern sections 715, 725 and 735 are shown below each of the pattern sections 710, 720 and 730. The pattern portion 715 includes a pattern element A and a pattern element B, designated as darker and lighter pattern portions A1x and B1x, respectively, each having an x axis dimension $x_1$ and y axis dimension $y_1$, and a corresponding spatial wavelength designated as WxA1B1 which is equal to $2x_1$ (i.e., similar to the x axis spatial wavelength of the pattern section 710). The pattern section 725 includes darker and lighter pattern portions A2x and B2x. Each of the pattern portions A2x and B2x has an x axis dimension $2x_1$ and a y axis dimension $y_1$ and for which a corresponding spatial wavelength WxA2B2 is equal to $4x_1$ (i.e., similar to the x axis spatial wavelength of the pattern section 720). The pattern section 735 includes darker and lighter pattern portions A3x and B3x, each having an x axis dimension $3x_1$ and a y axis dimension $y_1$ and for which an x axis spatial wavelength WxA3B3 is equal to $6x_1$ (i.e., similar to the x axis spatial wavelength of the pattern section 730).

As noted above with respect to FIG. 5, a checkerboard pattern with elements of a single size exhibits only a single primary spatial frequency (and some minor harmonic frequencies) in the power spectrum, and for which if utilized in a system with an objective lens with a frequency cutoff below that of the primary spatial frequency, then little or no projected pattern may be visible. A pattern section 750 conceptually illustrates one approach for creating a combination of spatial frequencies in a pattern (e.g., as including a weighted combination of the pattern sections 715, 725 and 735). More specifically, the pattern section 750 includes six pattern sections 715, three pattern sections 725 and two pattern sections 735. The pattern section 750 thus correspondingly includes six spatial wavelengths WxA1B1, three spatial wavelengths WxA2B2, and two spatial wavelengths WxA3B3. In accordance with such a combination, pattern portions of different sizes may be adjacent to one another, for which different combinations of spatial wavelengths may also be designated, as illustrated at the bottom of the pattern section 750 (e.g., illustrating spatial wavelengths WxB1A2, WxB2A1, WxB1A3, WxB3A1, etc.). Such combinations of spatial wavelengths in a pattern may have certain desirable characteristics (e.g., adding to the spectrum of spatial frequencies of the pattern in the power spectrum), as will be described in more detail below with respect to FIG. 8.

Figure 8:
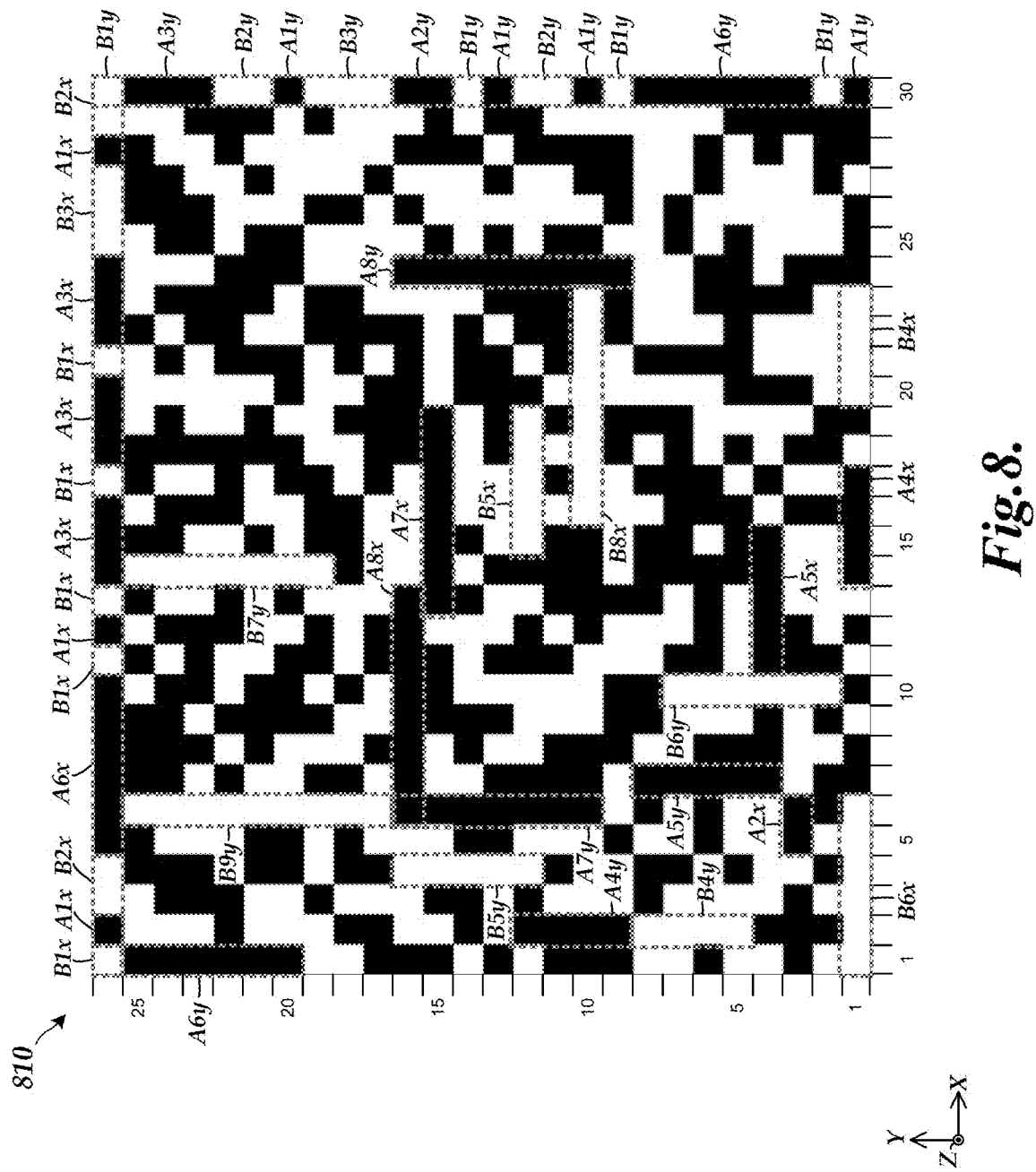
FIG. 8 is an enlarged section of a pattern including pattern portions that are not recurring at regular intervals across the pattern.

FIG. 8 is a section of a pattern including pattern portions (e.g., darker and lighter pattern portions) that are not recurring at regular intervals across the pattern. As will be described in more detail below, the pattern section 810 of FIG. 8 illustrates an enlarged pattern section from a pattern 900A of FIG. 9. As illustrated in FIG. 8, different pattern portions of varying sizes extend in both the x axis and y axis directions. The pattern section of FIG. 8 is designated as including 30 columns and 26 rows (e.g., of darker and lighter pattern portions), and may have some characteristics similar to those of other patterns described above (e.g., and may be fabricated utilizing a chrome on glass or other fabrication process, etc.). As illustrated in FIG. 8, the pattern section 810 (i.e., as a section of the pattern 900A of FIG. 9) is not limited to squares of a single element, or unit, size, etc. as in the checkerboard pattern 500A of FIG. 5, and may include pattern portions of multiple sizes (e.g., including multiple pattern elements) extending in both the x axis and y axis directions.

In various implementations, an element size may be defined as minimum element size that is utilized to form a pattern. In an example utilizing a chrome on glass process to form a pattern such as that of FIGS. 8 and 9, the minimum element size may be that of the smallest illustrated squares (e.g., for which the darker pattern elements "A" may correspond to chrome elements). In accordance with such configurations, a maximum spatial frequency of the pattern is thus defined by 2× the minimum element size. As will be described in more detail below, while a checkerboard pattern such as that of FIG. 5 may provide a high spatial frequency, it does not have certain desirable characteristics (e.g., a flat power spectrum), and for which more complex patterns (e.g., pattern 900A including pattern section 810) that do have such desirable characteristics may consist of various combinations of multiple pattern elements.

As some specific examples, darker and lighter pattern portions of different sizes have been labeled in the x axis direction in row 26, and in the y axis direction in column 30. For example, row 26 is shown to include darker and lighter pattern portions (i.e., with the darker pattern portions with an "A" designation and lighter pattern portions with a "B" designation similar to the other designations described above for the other figures). The row 26 is shown to include adjacent combinations of lighter and darker pattern portions of different sizes, such as a sequence of pattern portions B1x, A1x, B2x, A6x, B1x, A1x, B1x, A3x, B1x, A3x, B1x, A3x, B3x, A1x and B2x. Each of these pattern portions has a height along the y axis direction of 1y (e.g., corresponding to 1 unit) and for which the number designation indicates the number of units along the x axis direction (e.g., pattern portion A6x has a dimension of 6× or 6 units, along the x axis direction). As another example, the column 30 is shown to include a sequence of pattern portions A1y, B1y, A6y, B1y, A1y, B2y, A1y, B1y, A2y, B3y, A1y, B2y, A3y and B1y, each having a length along the x axis dimension of 1× (e.g., corresponding to one unit) and a length along the y axis as corresponding to the numbered designation. As described above with respect to FIG. 7, each of these adjacent combinations of different sized pattern portions may provide different spatial wavelength contributions for the spatial frequencies observed in a power spectrum for the pattern. As also noted above, each of the darker pattern portions and each of the lighter pattern portions are not recurring at regular intervals (e.g., at equally spaced intervals) across the pattern. In various implementations, the lighter pattern portions may correspond to spacings between the darker pattern portions (i.e., for which the darker pattern portions as spaced by the lighter pattern portions are not recurring at regular intervals across the pattern).

As further illustrated in FIG. 8, additional pattern portions of additional lengths (e.g., with a total of 8 or more different unit lengths) are also illustrated. For example, as noted above pattern portions A1x and A3x are illustrated in row 26, and a pattern portion A2x is illustrated in row 3, a pattern portion A4x is illustrated in row 1, a pattern portion A5x is illustrated in row 4, a pattern portion A6x is illustrated in row 26, a pattern portion A7x is illustrated in row 15, and a pattern portion A8x is illustrated in row 16. As further examples, as noted above pattern portions B1x, B2x and B3x are illustrated in row 26, and a pattern portion B4x is illustrated in row 1, a pattern portion B5x is illustrated in row 12, a pattern portion B6x is illustrated in row 1, and a pattern portion B8x is illustrated in row 10. As further examples, as noted above pattern portions A1y, A2y and A3y are illustrated in column 30, and a pattern portion A4y is illustrated in column 2, a pattern portion A5y is illustrated in column 7, a pattern portion A6y is illustrated in column 1, a pattern portion A1y is illustrated in column 6, and a pattern portion A8y is illustrated in column 24. As further examples, as noted above pattern portions B1y, B2y and B3y are illustrated in column 30, and a pattern portion B4y is illustrated in column 2, a pattern portion B5y is illustrated in column 4, a pattern portion B6y is illustrated in column 10, a pattern portion B7y is illustrated in column 14, and a pattern portion B9y is illustrated in column 6.

As noted above, it will be appreciated that each of these different sized darker and lighter pattern portions, as adjacent to other lighter or darker pattern portions, respectively, may provide different spatial wavelength contributions for the spatial frequencies observed in a power spectrum for the pattern. It will be appreciated that such a variety of adjacent combinations may in particular be achieved throughout a pattern which is not constrained with a requirement for the pattern portions to recur at regular intervals across the pattern (e.g., a non-periodic, pseudo-random, etc. pattern). In accordance with such characteristics, smaller or larger numbers of different sized darker and lighter pattern portions may provide different densities of spatial wavelengths, depending on the desired characteristics for the resulting pattern. As noted above, in some implementations it may also be desirable for there to be a relatively limited or smaller number and/or maximum size of larger pattern portions (e.g., larger darker and/or lighter pattern portions corresponding to lower spatial frequencies that are below the lowest cutoff frequency of the set of objective lenses) since such pattern portions may occupy significant area in the pattern and may cover significant numbers of pixels when magnified, etc. This consideration may also influence the desired number of different dimensions of pattern portions included in a pattern (e.g., for which it may be desired to have a maximum dimension and/or a maximum number of different dimensions of pattern portions such as 15, 20, 30, 40, etc.).

Figure 9:
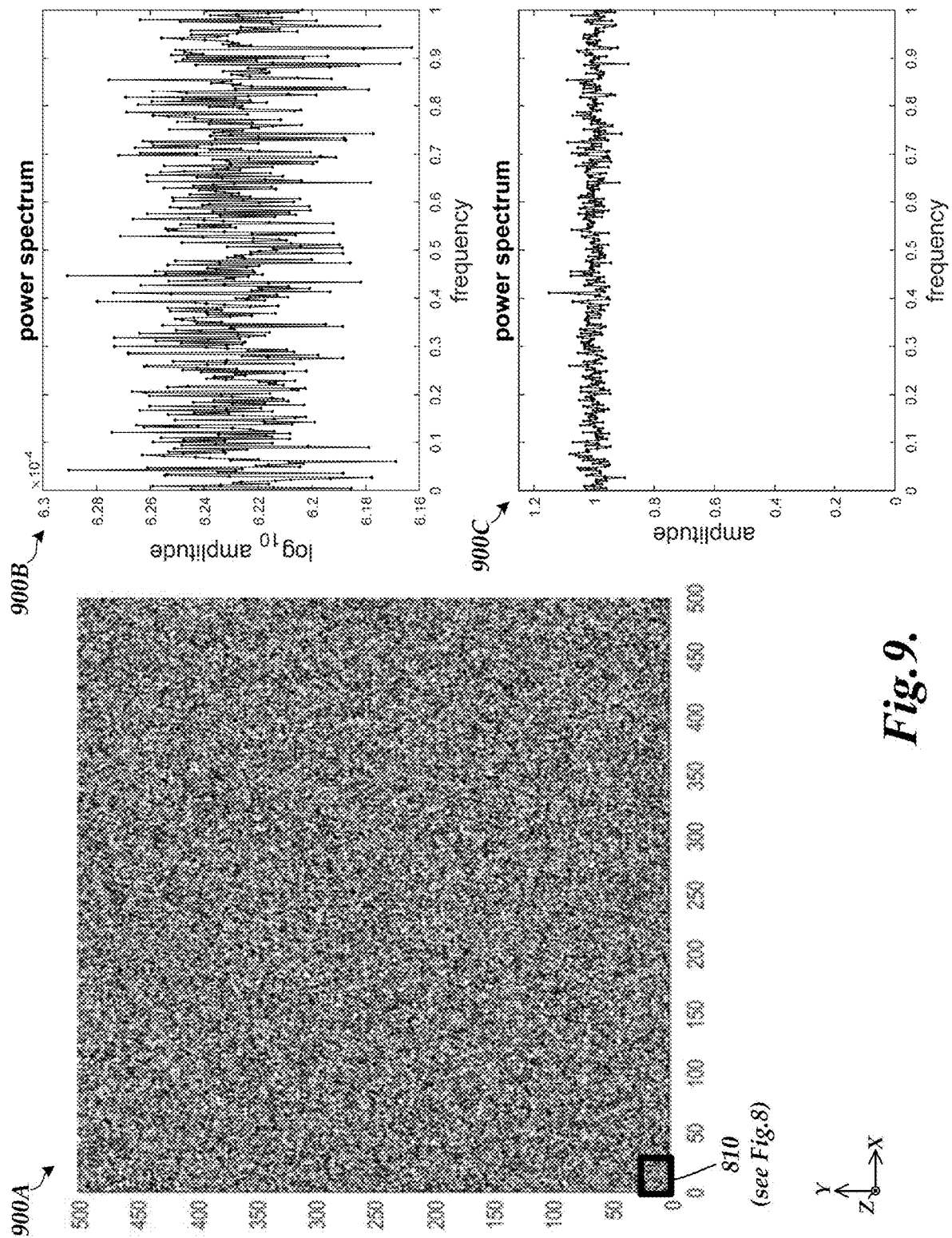
FIG. 9 is a diagram illustrating a full pattern including the pattern section of FIG. 8 with pattern portions that are not recurring at regular intervals across the pattern and corresponding power spectrum graphs.

FIG. 9 is a diagram of a pattern 900A (i.e., including the pattern section 810 of FIG. 8) and corresponding power spectrum graphs 900B and 900C. As described above with respect to FIG. 8, in the pattern 900A the different sized darker and lighter pattern portions are not recurring at regular intervals across the pattern. The corresponding power spectrum graphs 900B and 900C illustrate certain characteristics that may be advantageous for certain implementations. For example, in regard to the frequency response, the scale along the horizontal axis in the graph 900B is noted to be in a very limited range (e.g., with amplitude between 6.16 and 6.30), and for which the power spectrum is noted to be relatively constant/flat (e.g., for which at least a majority of the power spectrum over the desired range does not vary by more than 20%). The pattern 900A thus has spatial frequency characteristics resulting in a broad spectrum of frequencies in the power spectrum. As noted above, such broad frequency content may be desirable for various applications in which different lenses (e.g., different objective lenses) with different cutoff frequencies may be utilized. More specifically, when the pattern is projected, even if some of the frequency content is lost for some lenses, other lower frequencies present may still be projected by the system with resulting sufficient contrast in the images of the workpiece for determining focus curves with relatively high peaks (e.g., see focus curve 401 of FIG. 4A). In relation to the desired range, it may be desirable for the power spectrum to be relatively flat out to the highest cutoff frequency of the optical projection system (e.g., based on the highest cutoff frequency of the different lenses, such as objective lenses etc., that may be utilized with the system).

In various implementations, it is also desirable to have a pattern with a dark/light ratio of approximately 50/50 (e.g., wherein the total percentage of area of the pattern consisting of the darker pattern portions is nominally/approximately 50% and thus approximately equal to the total percentage of area of the pattern consisting of the lighter pattern portions which is also nominally/approximately 50%). As used herein, the term "nominally" encompasses variations of one or more parameters that fall within acceptable tolerances (e.g., with less than a 5% variation from the stated values and/or specified configuration, etc.). In addition, in various implementations, it may be desirable to have a pattern without repeating structure so as to avoid aliasing issues as well as self-imaging issues. In general, a pattern with characteristics similar to the pattern 900A (e.g., which may in some instances be defined as a pseudo random pattern, with a white noise type power spectrum within the desired range, or otherwise) is desirable in that it meets such objectives and does not preferentially degrade higher frequencies (e.g., as some instances of a pink or brown noise pattern may potentially do). In various implementations, a similar pattern with blue noise characteristics may also produce desirable results, as providing more energy at higher frequencies. In some implementations, in addition to the A and B type pattern elements and/or pattern portions, a pattern formed in accordance with principles disclosed herein may also include pattern elements and/or pattern portions of different shades, tints, colors, etc., for which each pattern element and/or pattern portion may be designated as a type of darker or lighter pattern element and/or pattern portion. For example, in such an implementation, the darker and lighter pattern elements and/or pattern portions may be in reference to an average (e.g., an average color, shade, etc.) of the pattern, for which there may be multiple types, shades, etc. of darker pattern elements and/or pattern portions (i.e., that are darker than the average of the pattern), and/or multiple types, shades, etc. of lighter pattern elements and/or pattern portions (i.e., that are lighter than the average of the pattern).

In certain implementations, the pattern 900A may be made of small square pattern elements (e.g., similar to pattern elements A and B of the pattern section 710 of FIG. 7). In such implementations, adjacent pattern elements A in the x or y axis directions may form darker pattern portions of corresponding dimensions, while adjacent pattern elements B in the x or y axis directions may form lighter pattern portions of corresponding dimensions. In various implementations, such pattern portions may result from certain positioning (e.g., random positioning, etc.) of the pattern elements A and/or B. As noted above, in various implementations the lighter pattern portions may correspond to spacings between the darker pattern portions (e.g., in an implementation formed by a chrome on glass or similar process, the darker pattern elements A may correspond to chrome portions, while the lighter pattern elements B may correspond to spacings between the darker pattern elements A). A total size of a pattern (e.g., similar to pattern 900A) in one specific example implementation may be approximately 9 mm×9 mm (e.g., which in some instances may be large enough to be larger than most CCD or CMOS pixel arrays of certain common camera image sensors). In such an implementation where the pattern elements are approximately 5 microns, there may be a total of approximately 3.2 million pattern elements in the pattern (i.e., (9 mm/0.005 mm)^2=3.2 million), and for which a dark/light ratio of approximately 50/50 corresponds to approximately 1.6 million darker pattern elements A (e.g., chrome pattern elements). As noted above with respect to the highest cutoff frequency of the objective lenses, it may be desirable for the pattern elements (e.g., pattern elements A and B and/or corresponding dimensions of various pattern portions) to not be smaller than a certain dimension (e.g., as corresponding to a high spatial frequency) due to the finite (e.g., lateral) resolution of the projection system (e.g., of the system 100 such as due to the highest cutoff frequency of the utilized lenses, etc.). Stated another way, if the dimensions of the pattern elements are below a minimum cutoff dimension, then when projected the pattern elements may be averaged over the area of the finite projection resolution and may not be visible (e.g., may become blurred out, for which no contrast may result). In various implementations, it may be desirable for the minimum element size to be near to the size of the minimum projection resolution of what can be passed by the optical system (e.g., in order to achieve/utilize the maximum amount of contrast possible when the objective lens with the highest cutoff frequency is utilized). In some implementations, a somewhat smaller element size may also be utilized for which some amount of averaging may be acceptable, as resulting in some amount of loss of contrast.

In accordance with principles disclosed herein, for a set of objective lenses to be utilized with a system (e.g., the system 100), the highest and lowest cutoff frequencies passed by the different objective lenses may be calculated or otherwise determined, and an element size may be selected/determined that is appropriate (e.g., a smallest pattern element/portion size may be selected/determined based at least in part on the highest cutoff frequency, and in some implementations a largest desired pattern portion size may be selected/determined based at least in part on a lowest cutoff frequency). In such implementations, with respect to the smallest pattern portion/element sizes, some amount of contrast may be lost for the objective lenses with the lower cutoff frequencies, but for which it has been determined experimentally that the remaining contrast may be sufficient for certain PFF type processes, etc.

In one specific example implementation, the cutoff frequencies for a set of objective lenses for the system may correspond to pattern element sizes that vary from 3.3 microns to 20 microns. Accordingly, a minimum pattern element size of 3.3 microns may be selected to match the highest projection frequency cutoff (e.g., and for which a smaller element size may cause a loss of contrast with little or no added benefit). In addition, as will be described in more detail below, a minimum element size near to the pixel size of the pixel array of the camera 260 (e.g., a 5 micron pixel size, or a 10 micron pixel size, etc.) may be desired so that the magnification by the turret lenses will cause as few gaps in the focus curve data (e.g., as utilized for PFF type processes) as possible. In addition, a pattern element size smaller than the pixel size may cause a loss of contrast at a 1× turret magnification (e.g., although for which this may be acceptable in some implementations if it is not a significant contrast loss and due to the consideration that at 2× turret magnification there may be a slight increase in contrast, and as may also depend on a minimum projection wavelength, etc.).

In various implementations, the primary characteristics of the turret lenses that are considered for the selection of the pattern element sizes is the corresponding increase in the scale of the pattern as projected (e.g., by a 2× turret lens, by a 6× turret lens, etc.), which in some implementations is a contributing reason for keeping the minimum pattern element dimensions relatively small. More specifically, in relation to the turret lenses (e.g., turret lenses 286 and 288 and/or other lenses of turret 280), in various implementations the magnification of those lenses may not change the frequency of what can be projected, but does serve to magnify the resultant pattern on the pixel array of the camera. Due to this aspect, it may be desirable for the pattern element size to be relatively as small as possible, so that it is not overly large when magnified by the turret lenses (e.g., for turret lenses with magnifications of 2×, 6×, etc.). For example, if a pattern element/portion size is relatively large to start with and then is further magnified by a turret lens, contrast data may not be obtained in the interior of the projected pattern element/portion (e.g., due to the magnified pattern element/portion covering more pixels than are utilized for calculating the contrast, such as if 3×3 or 7×7 pixels are utilized for calculating contrast and the magnified pattern element/portion covers more than that number of pixels). It will be appreciated that this may be another factor for determining the desired minimum element size of the pattern, in addition to the highest cutoff frequency of the utilized lenses, etc.

As a specific example, if a pattern element has x and y axis dimensions of 25 microns, and is projected through a 2× or 6× turret lens, the resulting projected pattern element sizes will have dimensions of 50 microns or 150 microns along the x axis and y axis directions, which may be significantly larger than a 10 micron square sized pixel, and for which gaps may result in the corresponding contrast data that is produced. More specifically, in this example for the 25 micron pattern element size, some gaps in the contrast data may result from even the 2× turret lens and the magnified 50 micron×50 micron pattern element for which with a camera pixel size of approximately 10 microns, the pattern element as projected with the 2× turret lens would cover approximately 25 pixels (i.e., an area of 5 pixels by 5 pixels). In general, in relation to the area used to compute contrast by the system (e.g., utilizing a 3×3, or 7×7, etc. pixel region of interest area for computing contrast), gaps in contrast data may occur depending on how many pixels are covered by a projected pattern element or portion (i.e., a darker or lighter pattern element or portion). In addition, as illustrated in FIG. 8, certain combinations of pattern portions may result in 4×4 blocks or larger of pattern elements, which at the 2× and 6× turret lens magnifications may cover a significant number of pixels for which gaps in the contrast data may occur.

In further regard to the turret magnification, the frequency cutoff of the projection optics (e.g., including the objective lens) will limit the wavelength of the projected pattern before it reaches the turret lens, for which the turret lens will then magnify the resulting portions of the projected/filtered pattern. As noted above with regard to the checkerboard pattern of FIG. 5, if the pattern is regular and includes a higher spatial frequency than the cutoff frequency of the projection optics, then there will be no contrast in the projected pattern to be magnified by the turret lens (i.e., all of the pattern elements/portions will be filtered out). If the pattern has characteristics similar to those of pattern 900A of FIG. 9, then depending on the cutoff frequency of the objective lens being utilized, at least some contrast will make it through (e.g., at least some of the larger pattern portions will not be filtered out) and the smallest wavelength scale of this projected pattern will be approximately the wavelength of the projection optics cutoff, which will then be magnified onto the pixel array of the camera by the turret lens. In various implementations the contrast may then be a function of the pixel size of the camera relative to the cutoff wavelength (i.e., multiplied by the magnification of the turret lens).

With regard to the camera pixel size, if the pixel size is relatively large (e.g., 20 microns) and the pattern element is smaller (e.g., 4 microns), then the individual pixels will average together several pattern elements and at least some amount of contrast will be lost. However, as pixel technology continues to develop, relatively smaller pixel sizes for cameras continue to be produced (e.g., below 10 microns, 5 microns, etc.) for which camera pixel sizes in some implementations may be considered to be relatively less of a limiting factor with regard to pattern element sizes for meeting the other desired characteristics of the system as described above. For example, in certain practical implementations, a smallest pattern element size may be approximately 4 microns, which may also be close to what can be easily manufactured by chrome on glass technologies, etc. which in some current implementations may be currently in the range of approximately 1 micron square.

In relation to pixel sizes versus pattern element sizes and the spatial frequencies that may correspondingly be resolved, if the pattern wavelength is two times the pixel size (e.g., with the pattern elements of the same size as the pixel size) the pattern wavelength can be resolved. In frequency terms, in such an implementation the spatial frequency of the pattern is just at the limit of what can be resolved by the sampling frequency. Alternatively, if the pattern element size has a dimension that is one-half the size of the pixel dimension, the pattern wavelength may be one pixel long, for which in frequency terms, the spatial frequency of the pattern would be one-half the sampling frequency and could not be resolved. In some implementations, pattern element sizes smaller than the pixel size may still create some amount of contrast because neighboring pixels may have differing numbers of light and dark pattern elements covering their area. However, the smaller the element sizes, the more the overall contrast within a pixel tends to be averaged and the less effective the pattern becomes for creating contrast. As noted above, current pixel technology (e.g., with pixel sizes at or below 10 microns, 5 microns, etc.) may make such concerns less of an issue, in that in various practical implementations the camera pixels may be able to be as small as the desired smallest pattern element sizes.

Figure 10:
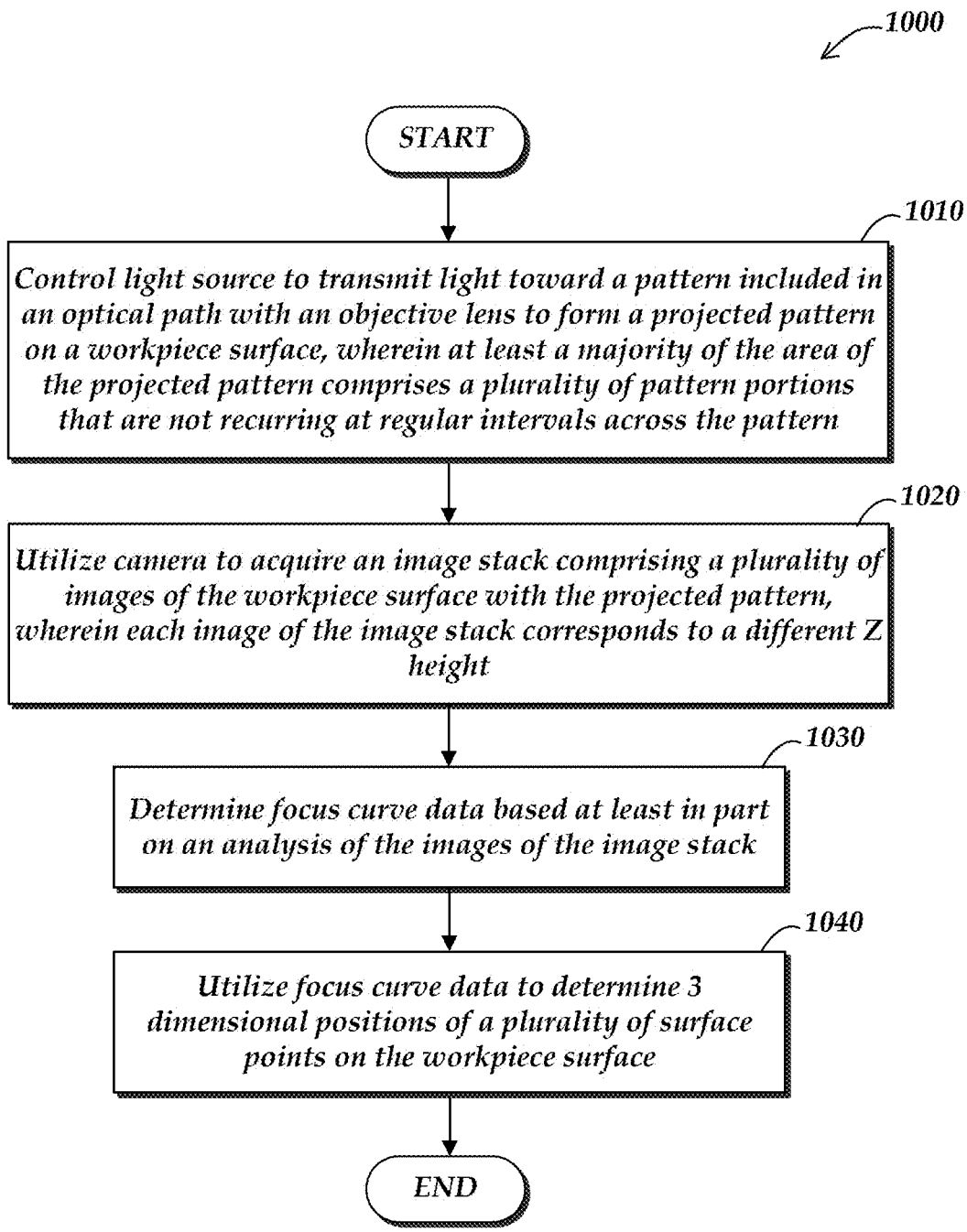
FIG. 10 is a flow diagram showing a method for operating a metrology system including a pattern projection portion in accordance with principles disclosed herein.

FIG. 10 is a flow diagram showing a method 1000 for operating a metrology system including a pattern projection portion in accordance with principles disclosed herein. At a block 1010, a light source is controlled to transmit light toward a pattern included in an optical path with an objective lens to form a projected pattern on a workpiece surface, wherein at least a majority (e.g., 50% or more) of the area of the projected pattern comprises a plurality of pattern portions that are not recurring at regular intervals across the pattern. At a block 1020, a camera is utilized to acquire an image stack comprising a plurality of images of the workpiece surface with the projected pattern, wherein each image of the image stack corresponds to a different Z-height. At a block 1030, focus curve data is determined based at least in part on an analysis of the images of the image stack. At a block 1040, the focus curve data is utilized to determine 3 dimensional positions of a plurality of surface points on the workpiece surface.

In various implementations, the method 1000 may be repeated after changing the magnification state of the metrology system by changing the objective lens that is included in the objective lens portion (e.g., to be a second objective lens that has a second cutoff frequency that is different than a cutoff frequency of the previously utilized first objective lens). For example, after changing to the second objective lens, the light source may be controlled to transmit light toward the pattern included in the optical path with the second objective lens to form a second projected pattern on the workpiece surface (or a different workpiece surface), wherein the second projected pattern is partially filtered by the second cutoff frequency and at least a majority of the area of the second projected pattern comprises a second plurality of pattern portions that are not recurring at regular intervals across the pattern. It will be appreciated that due to the different filtering by the second objective lens (i.e., in accordance with the second cutoff frequency), the second plurality of pattern portions may be different than the first plurality of pattern portions corresponding to when the first objective lens was utilized (e.g., more or less smaller pattern portions may have been filtered out, etc.). However, in accordance with the pattern (e.g., the pattern 305 on the pattern component 302) having spatial frequency characteristics resulting in a broad spectrum of frequencies in the power spectrum (i.e., in accordance with principles disclosed herein), both the first and second plurality of pattern portions in the respective first and second projected patterns may be sufficient/effective for producing a desirable level of contrast in images of the workpiece surface (e.g., for PFF type processes, etc.)

The camera may then be utilized to acquire a second image stack comprising a second plurality of images of the workpiece surface with the second projected pattern, wherein each image of the second image stack corresponds to a different Z-height. It will be appreciated that in accordance with the different magnification of the second objective lens, the area of workpiece surface (i.e., as part of the same workpiece surface or a different workpiece surface) that is included in the field of view may be different than the area of workpiece surface included in the field of view when the first objective lens was utilized (e.g., a second objective lens with a higher magnification than that of a first objective lens may result in a magnified and correspondingly smaller amount of area of a workpiece surface in the field of view).

Second focus curve data may then be determined based at least in part on an analysis of the images of the second image stack, and the second focus curve data may be utilized to determine 3 dimensional positions of a plurality of surface points on the workpiece surface (e.g., as part of PFF type processes, etc.)

In general, a pattern with characteristics in accordance with principles such as those disclosed herein (e.g., similar to the characteristics of the pattern 900A of FIG. 9) may be desirable for a number of reasons. For example, as noted above it may be desirable to have a pattern with a broad range of spatial frequencies since a pattern with a single spatial frequency cannot be matched to all of the set of objective lenses and/or other lenses that may be utilized with a system (e.g., the system 100). As illustrated by the examples of FIGS. 5 and 6, it may be difficult to make a pattern with a broad range of frequencies unless it has characteristics similar to those of the pattern 900A of FIG. 9. In certain implementations, for the desired range (e.g., as determined in part by the cutoff frequencies of the objective lenses and/or other lenses to be utilized), it may be desirable for the power spectrum (e.g., which may be characterized as being equal to the Fourier transform of the pattern squared) to be a nominally/approximately constant value within the desired range. In some implementations, this may also correspond to an approximate definition of white noise within the desired range. In certain implementations, a pseudo random pattern such blue noise, or similar, can appropriately create high frequency texture on the object. In various implementations, a type of pseudo random pattern (e.g., a pseudo random bit map pattern, etc.) may approximately meet such criteria for which the minimum pattern element size and/or desired range of pattern portion sizes may be determined in accordance with criteria such as those described above.

With respect to the minimum pattern element size, as described above it may generally be desirable for the pattern to not contain higher spatial frequencies than a desired range (e.g., for which it may be desirable for the minimum element size utilized for the pattern to not be smaller than certain dimensions). More specifically, due to the highest cutoff frequency as noted above, any higher spatial frequencies of the pattern would not be projected by the optics even when the system is utilizing the lens (e.g., an objective lens) with the highest cutoff frequency. As a result of not being projected, such higher frequencies (e.g., as corresponding to smaller pattern portions that would not appear in the projected pattern) would effectively lower the available contrast of the pattern which may generally be undesirable in certain implementations. In some implementations, a somewhat smaller element size may also be utilized for which some amount of averaging may be acceptable, as resulting in some amount of loss of contrast.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. A metrology system, comprising:
  an objective lens portion including an objective lens selected from a set of objective lenses, wherein each of the objective lenses in the set has a different magnification and a cutoff frequency, and a magnification state of the metrology system is configured to be changed by changing the objective lens that is included in the objective lens portion;
  a light source;
  a pattern projection portion comprising a pattern component with a pattern, wherein at least a majority of the area of the pattern comprises a plurality of pattern portions that are not recurring at regular intervals across the pattern, wherein the pattern portions comprise darker pattern portions and lighter pattern portions, and the pattern portions comprise pattern portions that are of different sizes, for which the different sized pattern portions comprise at least first, second, third and fourth sized pattern portions, for which the second, third and fourth sized pattern portions each have a length that is at least two, three or four times, respectively, as large as a corresponding length of the first sized pattern portion, and wherein light from the light source is configured to be transmitted toward the pattern to form pattern light that is transmitted through the objective lens to form a projected pattern on a workpiece surface, and for which the objective lens is configured to input image light arising from the workpiece surface including the projected pattern and transmit the image light along an imaging optical path;
  a camera configured to receive image light transmitted along the imaging optical path and provide images of the workpiece surface including the projected pattern;
  one or more processors; and
  a memory coupled to the one or more processors and storing program instructions that when executed by the one or more processors cause the one or more processors to at least:
    control the light source to transmit light toward the pattern to form the projected pattern on the workpiece surface;
    utilize the camera to acquire an image stack comprising a plurality of images of the workpiece surface with the projected pattern, wherein each image of the image stack corresponds to a different Z-height; and
    determine focus curve data based at least in part on an analysis of the images of the image stack, wherein the focus curve data indicates 3 dimensional positions of a plurality of surface points on the workpiece surface.

2. The system of claim 1, wherein the plurality of pattern portions of the pattern correspond to spatial frequencies that are below the highest cutoff frequency of the objective lenses in the set of objective lenses.

3. The system of claim 1, wherein the set of objective lenses comprises a lowest magnification lens that corresponds to a lowest magnification of the set, a highest magnification lens that corresponds to a highest magnification of the set, and a plurality of intermediate magnification lenses that each correspond to a respective intermediate magnification that are each between the lowest and highest magnifications, and for which the highest magnification is at least 10 times the lowest magnification.

4. The system of claim 3, wherein at least some of the objective lenses of the set of objective lenses each correspond to respective magnifications of at least one of 0.5×, 1×, 2×, 2.5×, 5×, 10×, 20×, 25×, 50×, or 100×.

5. The system of claim 1, further comprising a turret with a plurality of turret lenses, wherein each turret lens corresponds to a different magnification, and the turret is configured to position one of the turret lenses in the imaging optical path.

6. The system of claim 1, wherein each of the plurality of surface points on the workpiece surface corresponds to a region of interest in each of the images of the image stack and the determining of the focus curve data comprises determining focus curve data for each of the regions of interest based at least in part on an analysis of the images of the image stack, wherein for each of the surface points a peak of the focus curve data for the corresponding region of interest indicates a corresponding Z-height of the surface point and for which the peak at least partially results from contrast provided by pattern portions of the projected pattern.

7. The system of claim 1, wherein the total amount of area of the pattern corresponding to the darker pattern portions has less than a 5% difference from the total amount of area of the pattern corresponding to the lighter pattern portions.

8. The system of claim 1, wherein the lighter pattern portions correspond to spacings between the darker pattern portions.

9. The system of claim 8, wherein the pattern is formed on the pattern component with a chrome on glass type process.

10. The system of claim 1, wherein the different sized pattern portions further comprise at least fifth, sixth, seventh and eighth sized pattern portions, for which the fifth, sixth, seventh and eighth sized pattern portions each have a length that is at least five, six, seven or eight times, respectively, as large as a corresponding length of the first sized pattern portion.

11. The system of claim 1, wherein a largest pattern portion of the plurality of pattern portions is less than twenty times the size of a smallest pattern portion of the plurality of pattern portions.

12. The system of claim 1, wherein the first sized pattern portion is a smallest pattern portion of the plurality of pattern portions and has an area that is at least 2 microns by 2 microns and is at most 20 microns by 20 microns.

13. The system of claim 12, wherein the camera comprises a pixel array for which the pixels each have an area that is at least at least 2 microns by 2 microns and is at most 20 microns by 20 microns.

14. The system of claim 1, wherein adjacent darker and lighter pattern portions of the plurality of pattern portions are in sequences that are not recurring at regular adjacent intervals across the pattern in either x-axis or y-axis directions of the pattern.

15. The system of claim 1, wherein the pattern projection portion further comprises a pattern positioning portion configured to be controlled to position the pattern component in an optical path between the light source and the objective lens.

16. A method for operating a metrology system, the metrology system including:
an objective lens portion including an objective lens selected from a set of objective lenses, wherein each of the objective lenses in the set has a different magnification and a cutoff frequency, and a magnification state of the metrology system is configured to be changed by changing the objective lens that is included in the objective lens portion;
a light source;
a pattern projection portion included in an optical path with the objective lens portion and comprising a pattern component with a pattern that is configured to be projected onto a workpiece surface;
a camera that receives image light transmitted along an imaging optical path from the objective lens and provides images of the workpiece surface including the projected pattern;
the method comprising:
controlling the light source to transmit light toward the pattern included in the optical path with the objective lens to form a projected pattern on the workpiece surface, wherein at least a majority of the area of the projected pattern comprises a plurality of pattern portions that are not recurring at regular intervals across the pattern, wherein the pattern portions comprise darker pattern portions and lighter pattern portions, and the pattern portions comprise pattern portions that are of different sizes, for which the different sized pattern portions comprise at least first, second, third and fourth sized pattern portions, for which the second, third and fourth sized pattern portions each have a length that is at least two, three or four times, respectively, as large as a corresponding length of the first sized pattern portion;
utilize the camera to acquire an image stack comprising a plurality of images of the workpiece surface with the projected pattern, wherein each image of the image stack corresponds to a different Z-height;
determine focus curve data based at least in part on an analysis of the images of the image stack; and
utilize the focus curve data to determine 3 dimensional positions of a plurality of surface points on the workpiece surface.

17. The method of claim 16, wherein the plurality of pattern portions of the projected pattern correspond to spatial frequencies that are below the highest cutoff frequency of the objective lenses in the set of objective lenses.

18. The method of claim 16, wherein the pattern projection portion includes a pattern positioning portion and the method further includes controlling the pattern positioning portion to position the pattern component in the optical path between the light source and the objective lens.

19. The method of claim 16, wherein the objective lens included in the objective lens portion is a first objective lens that has a first cutoff frequency and the projected pattern is a first projected pattern that is at least partially filtered by the first cutoff frequency and the plurality of pattern portions are a first plurality of pattern portions, the method further comprising:
changing the magnification state of the metrology system by changing the objective lens that is included in the objective lens portion to be a second objective lens that has a second cutoff frequency that is different than the first cutoff frequency;
controlling the light source to transmit light toward the pattern included in the optical path with the second objective lens to form a second projected pattern on the workpiece surface, wherein the second projected pattern is at least partially filtered by the second cutoff frequency and at least a majority of the area of the second projected pattern comprises a second plurality of pattern portions that are not recurring at regular intervals across the pattern, and for which the second plurality of pattern portions is different than the first plurality of pattern portions due at least in part to the different filtering by the first and second cutoff frequencies;

utilize the camera to acquire a second image stack comprising a second plurality of images of the workpiece surface with the second projected pattern, wherein each image of the second image stack corresponds to a different Z-height;

determine second focus curve data based at least in part on an analysis of the images of the second image stack; and utilize the second focus curve data to determine 3 dimensional positions of a plurality of surface points on the workpiece surface.

20. A pattern projection portion for use with a metrology system, the metrology system including:
an objective lens portion including an objective lens selected from a set of objective lenses, wherein each of the objective lenses in the set has a different magnification and a cutoff frequency, and a magnification state of the metrology system is configured to be changed by changing the objective lens that is included in the objective lens portion;
a light source; and
a camera configured to receive image light transmitted along the imaging optical path and provide images of the workpiece surface including the projected pattern;

the pattern projection portion comprising:
a pattern component with a pattern, wherein at least a majority of the area of the pattern comprises a plurality of pattern portions that are not recurring at regular intervals across the pattern, wherein the pattern portions comprise darker pattern portions and lighter pattern portions, and the pattern portions comprise pattern portions that are of different sizes, for which the different sized pattern portions comprise at least first, second, third and fourth sized pattern portions, for which the second, third and fourth sized pattern portions each have a length that is at least two, three or four times, respectively, as large as a corresponding length of the first sized pattern portion; and a pattern positioning portion configured to position the pattern component in an optical path between the light source and the objective lens;

wherein after the pattern component is positioned in the optical path, light from the light source is configured to be transmitted toward the pattern to form pattern light that is transmitted through the objective lens to form a projected pattern on the workpiece surface, and for which the objective lens is configured to input image light arising from the workpiece surface including the projected pattern and transmit the image light along the imaging optical path and for which the camera is configured to receive the image light transmitted along the imaging optical path and capture an image stack comprising a plurality of images of the workpiece surface with the projected pattern, wherein each image of the image stack corresponds to a different Z-height and for which the images are configured to be analyzed to determine focus curve data that indicates 3 dimensional positions of a plurality of surface points on the workpiece surface.

21. The pattern projection portion of claim 20, wherein the plurality of pattern portions of the pattern correspond to spatial frequencies that are below the highest cutoff frequency of the objective lenses in the set of objective lenses.

22. The pattern projection portion of claim 20, wherein the different sized pattern portions further comprise at least fifth, sixth, seventh and eighth sized pattern portions, for which the fifth, sixth, seventh and eighth sized pattern portions each have a length that is at least five, six, seven or eight times, respectively, as large as a corresponding length of the first sized pattern portion.

23. The pattern projection portion of claim 20, wherein the first sized pattern portion is a smallest pattern portion of the plurality of pattern portions and is square.

24. The pattern projection portion of claim 23, wherein the first sized pattern portion has an area that is at least 2 microns by 2 microns and is at most 20 microns by 20 microns.

* * * * *